(12) United States Patent
Goldberg et al.

(10) Patent No.: US 7,574,284 B2
(45) Date of Patent: Aug. 11, 2009

(54) METHOD AND APPARATUS FOR OPTIMIZING SOIL MOISTURE

(75) Inventors: Allan Morris Goldberg, Laguna Niguel, CA (US); Larry Kent Hopkins, Escondido, CA (US); Larry Hawkes, San Diego, CA (US); James Zimmerman, Walnut, CA (US)

(73) Assignee: The Toro Company, Bloomington, MN (US)

( * ) Notice: Subject to any disclaimer, the term of this patent is extended or adjusted under 35 U.S.C. 154(b) by 0 days.

(21) Appl. No.: 11/555,200

(22) Filed: Oct. 31, 2006

(65) Prior Publication Data

US 2007/0055407 A1   Mar. 8, 2007

Related U.S. Application Data

(62) Division of application No. 11/056,846, filed on Feb. 10, 2005, now Pat. No. 7,133,749.

(60) Provisional application No. 60/544,251, filed on Feb. 11, 2004.

(51) Int. Cl.
 *G05B 11/01* (2006.01)
(52) U.S. Cl. ............... 700/284; 137/78.2; 137/78.3; 700/282; 700/281; 239/63
(58) Field of Classification Search ........... 700/284; 137/78.2, 78.3; 239/63
See application file for complete search history.

(56) References Cited

U.S. PATENT DOCUMENTS 6,145,755 A    11/2000   Feltz 6,895,987 B2    5/2005   Addink et al.
2001/0049563 A1   12/2001   Addink et al.

OTHER PUBLICATIONS

"Calculate Field Capacity From Percentage?"—Usenet newsgroup posting to aqua.ccwr.ac.za, Jan. 26, 2002. Full thread.*
"Guidelines for designing and evaluating surface irrigation systems: FAO Irrigation and Drainage Paper 45" -by W.R. Walker Professor and Head—Department of Agricultural and Irrigation Engineering, Utah State University. Rome, 1989. Chapter 3.*
"Applied BNF Technology—A Practical Guide for Extension Specialists", Singleton et al, NifTAL Project/BNF Technologies for International Development, University of Hawaii, Oct. 1990.*

\* cited by examiner

*Primary Examiner*—Michael D Masinick
(74) *Attorney, Agent, or Firm*—Inskeep IP Group, Inc.

(57) ABSTRACT

A self-adjusting irrigation controller takes a pre-irrigation soil moisture reading prior to irrigation, chooses an amount of water to be dispensed corresponding to that reading from a table, and dispenses that amount of water. A predetermined length of time after the end of irrigation, the controller takes a post-irrigation soil moisture reading and compares the value of that reading to a predetermined target value. If the post-irrigation value differs substantially from the target value, the water amount corresponding to the pre-irrigation value in the table is adjusted to reduce that difference on the next scheduled irrigation cycle having that same pre-irrigation soil moisture reading. The target value is determined by watering the soil to field capacity, then computing the target value as a function of the reading of the sensor at field capacity. The controller thus converges toward an ideal runtime and follows changes in the environment. In the preferred embodiment, the soil moisture is indicated by sensor voltages, and the amount of water dispensed is governed by the runtime of the irrigation system.

4 Claims, 9 Drawing Sheets

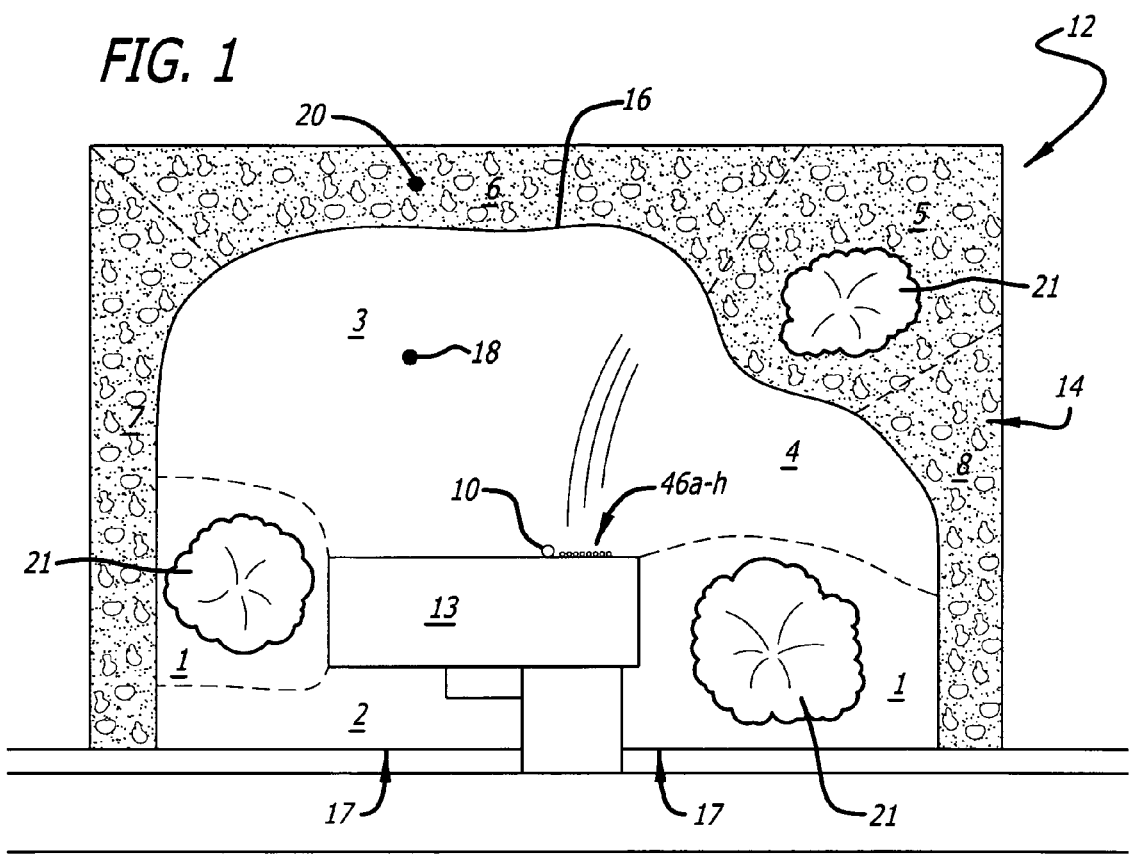
FIG. 1
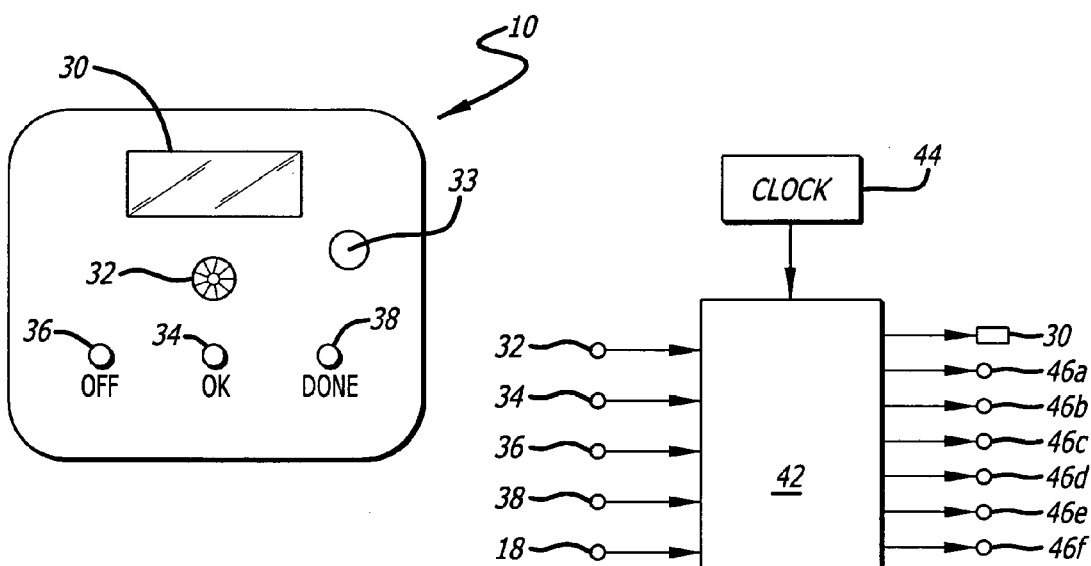
FIG. 2
FIG. 3

METHOD AND APPARATUS FOR OPTIMIZING SOIL MOISTURE

RELATED APPLICATIONS

The present invention is a divisional of U.S. patent application Ser. No. 11/056,846 filed Feb. 10, 2005 now U.S. Pat. No. 7,133,749, which claims benefit of U.S. Provisional Application Ser. No. 60/544,251, filed Feb. 11, 2004; both of which are incorporated herein by reference.

FIELD OF THE INVENTION

This invention relates to irrigation control systems, and more particularly to a system that automatically adjusts watering runtimes to maintain optimal soil moisture under varying climatic and soil conditions in accordance with timed moisture measurements by sensors strategically placed in representative irrigation zones.

BACKGROUND OF THE INVENTION

Conventional irrigation controllers water a set of irrigation zones in accordance with a time schedule programmed by an operator. Such programming is typically guesswork and cannot adapt the controller to changing weather or soil conditions without an impractical amount of reprogramming.

It has previously been proposed to associate a moisture sensor with a valve watering a given zone, and to allow scheduled watering only until the soil of the zone reaches a pre-selected moisture content, or conversely to disallow the initiation of a standard irrigation cycle if the soil of that zone, or a representative zone, is above a pre-selected moisture content. This does prevent over-watering on cool or rainy days, but it does not continually adjust the irrigation system to maintain an ideal level of soil moisture.

It has also been proposed to vary the runtime of a controller in response to daily measured or predicted climatological parameters, but in such a system the runtime is expectation-driven rather than being driven by actual soil moisture conditions.

OBJECTS AND SUMMARY OF THE INVENTION

The present invention automatically maintains an ideal moisture level in each of a number of zones by first determining the field capacity, i.e. the water-absorbing ability of the soil in a selected master zone, and then comparing, on a day-to-day basis, the actual post-irrigation soil moisture to a target value based on that ability. The comparison is made a sufficient time after the end of watering for the soil moisture content to have stabilized. The result of the comparison is used to so alter the next runtime of the controller that the soil moisture of the master zone is maintained as closely as possible to the target value when the soil moisture has stabilized. To take into account the effects of conditions such as shade or land contour, individual zones can be adjusted to water in a selected proportion to the master zone. This does not preclude the possibility of having a sensor for each zone if the equipment and labor cost is not prohibitive.

BRIEF DESCRIPTION OF THE DRAWINGS

FIG. 1 is a plan view of an environment using the inventive controller;

FIG. 2 is a front elevation of the controller of this invention;

FIG. 3 is a block diagram of the inventive controller;

DETAILED DESCRIPTION OF THE INVENTION

Description of the Preferred Embodiment

A. Environment

Figure 4A:
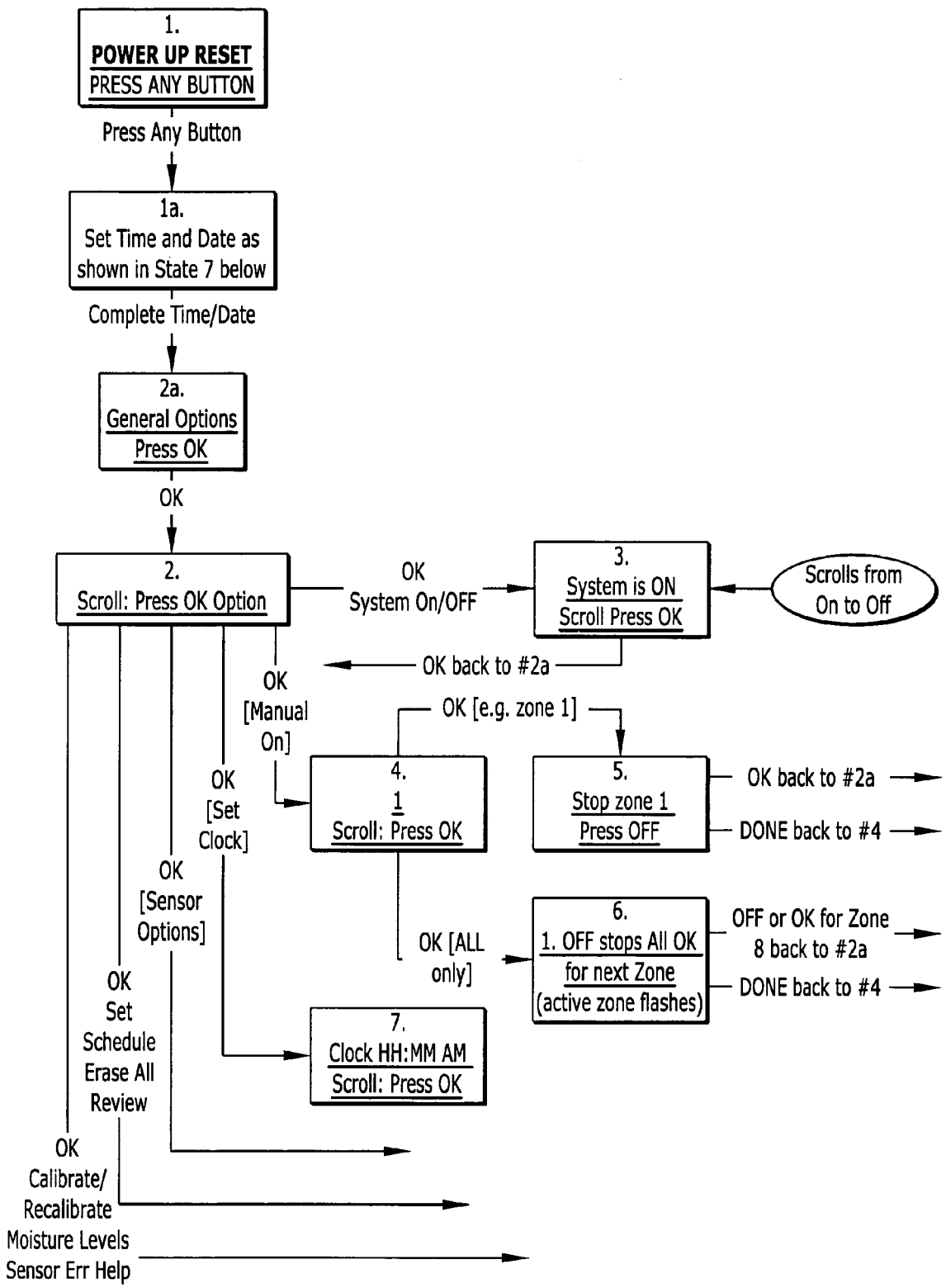
FIGS. 4a through 4d, taken together, constitute a flow chart detailing the operation of the inventive controller.

FIG. 1 illustrates a typical environment in which the invention would be useful. A lot 12 contains a house 13 with a rear lawn 16, a front lawn 17, and landscaping plant beds or shrubs 14 along the perimeter fence. The lawns and shrubs are irrigated by sprinklers (not individually shown) arranged in zones 1 through 8. The sprinklers are connected to a water supply (not shown) by way of electrically operated valves 46a through 46h. Each of the valves 46a through 46h controls all the sprinklers in a given one of zones 1-8. The valves 46a through 46h are in turn operated by the Sensor Interface Controller (SIC) 10 of this invention, as described in detail below.

The layout of FIG. 1 assumes that the lawn zones 1 through 4 all have more or less the same type of soil, although the sprinkler runtimes necessary to maintain an optimum soil moisture level differ slightly by a known percentage from zone to zone due to the presence of trees 21, the location with respect to the house 13, or the elevation and drainage of various parts of the lawn. The plant beds or shrubs 14, on the other hand, are assumed to have a topsoil of very different water retention and drainage characteristics. The runtimes of the shrub sprinklers for optimum moisture level maintenance also vary slightly from one of the zones 5-8 to another by a consistent percentage learned through experience or scientifically developed relationships.

To accommodate these differences, two moisture sensors 18, 20 are placed at root level in zones 3 and 6, respectively. The lawn zones 1-4 are grouped together under the control of sensor 18, and are herein referred to as the zones of group A. Likewise, the shrub zones 5-8 are grouped together under the control of sensor 20, and are herein referred to as the zones of group B. The number of zones containing sensors could be greater, with a corresponding reduction in the number of dependent zones in the group.

In FIG. 1, zone 3 has been chosen as the master zone of group A because it contains the sensor 18. Zone 6 has been chosen as the master zone of group B because it contains the sensor 20. The moisture sensors 18, 20 are electrically connected to the SIC 10 by appropriate communication means. Thus, the SIC 10 directly controls the runtimes of master zones 3 and 6 in response to the sensor readings as described below, and the other zones follow the runtimes of their respective master zones as modified by a fine tuning factor that is separately selectable for each non-master zone.

B. General Functional Description

1) Overview

The SIC 10 of this invention (FIG. 2) provides a user-friendly interface to an irrigation system 12 (FIG. 1) which automatically determines the optimum moisture level of the soil, and then applies the amount of water required to maintain it at that level in accordance with user-determined start time and schedule parameters. The method used by the SIC 10 to determine the amount of water needed makes the controller self-adjusting to changes in soil moisture due to evapotranspiration and other loss factors, and over time, tailors the applied amount of water to the specific needs of each environment in the system 12, such as the shrub area 14 or the lawn area 16, 17.

2) Sensors and Zones

As pointed out above, the SIC 10 in its preferred embodiment may have two soil moisture sensors 18, 20 (also referred to herein as Sensor 1 and Sensor 2, respectively) and eight watering zones 1 through 8. Each of the zones 1 through 8 is assigned to a selectable one of the sensors 18, 20. If only one sensor is used, all eight zones will be assigned to that sensor. If two sensors are used, the eight zones will be divided between the sensors 18 and 20, with each sensor having at least one associated zone. One of the zones associated with each sensor 18 or 20 is considered to be the master zone for that sensor. The master zone is the zone most closely associated with its sensor, e.g. the zone containing the sensor. It is preferably the zone with the most representative soil conditions of its group, and it is ideally watered only by the sprinklers in that zone.

Each of the zones 1 through 8 is assigned a fine tuning factor (FTF) used to adjust the zone's runtime. The FTF is a percentage value indicating the anticipated typical relationship between moisture content in that zone and moisture content in the master zone of the same zone group. The FTF can be important in cases where, due to variations in soil composition or drainage, sun or shade, degree of slope or many other factors the sensor readings associated with a master zone do not precisely reflect the irrigation needs of other zones assigned to the same sensor, yet have an essentially constant relationship thereto. Because of the direct relationship between the master zone and its sensor, the value of the FTF for the master zone is always 100%. The value of the FTF for the other zones may preferably be selectable from 60% to 140% in 10% increments, although other finer or coarser increments could also be built into the design.

3) Moisture Content of the Soil and Amount of Water Needed

The moisture content of the soil can be quantified in terms of a voltage returned from the moisture sensor 18 or 20 placed in the irrigated area, preferably at root level. Other types of sensor outputs such as current, digital output, FM analog signal such as TDR (time domain reflectometry), etc. can similarly be accommodated by the principles shown herein. In the sensors used in the preferred embodiment described herein, the sensor voltage ranges from, e.g., a value close to zero when the sensor is submerged in water, to 4.86 V when it is air-dry, although the practical operating voltage in soil usually ranges from about 1 V to 2 V. The SIC 10 periodically monitors the voltages of the sensors 18 and 20 in order to accurately reflect the current levels of moisture content in the respective sensors' master zones.

One of the parameters of the SIC 10 is "field capacity", as determined by an automatically run calibration procedure described in Section E.3) hereof. Field capacity is a measure of the soil's ability to absorb moisture. Knowing the field capacity, an optimum or target level of moisture content can be established. That target level may be represented by a target voltage $S_t$ which is the desired sensor reading at a predetermined time (on the order of two hours covers most soils) after completion of an irrigation cycle, at which time the moisture content of the soil has essentially stabilized. The target voltage may be calculated by an empirically determined formula (see formula (1) in Section E.3) hereof) to correspond to a level of moisture content considered optimal for plant support. A preferred $S_t$ may be, for example, 1.125 V.

The amount of water needed is quantified in terms of minutes and/or seconds of master zone runtime required to apply the amount of water necessary to bring the sensor reading to the target value. Depending upon the requirements of a specific installation, the quantification may be in terms of other parameters such as, for example, inches of water to be delivered.

The SIC 10 described herein, which uses runtime as the quantification parameter, maintains in its memory a table of runtimes whose entries represent discrete approximations of moisture-content/water-needed (MC/WN) values for each of the sensors 18, 20. In the beginning, the SIC 10 uses preset default values for each sensor. For example, the moisture-content (i.e. sensor output such as voltage) component of the table entries may range from maximum dryness (e.g. 2.999 V) to target wetness (e.g. 1.125 V), and the water-needed (i.e. runtime) component in a fifteen-entry table may range from one to fifteen minutes. Over time, the SIC 10 will automatically modify the WN values corresponding to various MC ranges in accordance with feedback from the sensors 18, 20 as described below.

The voltage span from one table entry to the next is called a "Table Delta" in this description. For example, as described in more detail in Sections D.7)e) and E.3) hereof, the target value $S_t$ for optimum vegetation growth may be selectively adjustable from, e.g., one Table Delta above field capacity to three Table Deltas above field capacity in ½ Table Delta increments in the described embodiment, but could be set to other ranges.

4) Irrigation Using the Moisture-Content/Water-Needed Tables

Each watering day during normal operation, at the user-selected start time of an irrigation cycle, the SIC 10 first determines the current moisture content of the soil by examining the voltages returned by each of the sensors 18 and 20. If the voltage returned by a sensor is less than the target voltage (i.e. the soil at the sensor is too wet), the SIC 10 will not irrigate the zones associated with that sensor during that irrigation cycle. If, on the other hand, the voltage returned by a sensor is higher than the target voltage, the SIC 10 determines a runtime for the master zone and each subordinate zone associated with that sensor by using the returned voltage as an index into the MC/WN table for that sensor. Specifically, the table of voltage/runtime (MC/WN) is examined for the voltage value most closely matching the current sensor reading. The runtime associated with this voltage is taken as a base runtime value for the corresponding master zone. This base runtime value is then used to determine individual zone runtimes.

Adjusted runtimes are determined for each zone by modifying the base runtime value using the FTF selected for that zone. Since the value of the FTF for the master zone is always 100%, the base runtime value is used directly as the runtime for the master zone. The adjusted runtimes for the other zones associated with the same sensor are a percentage of the base runtime value determined by the value of the FTF for the zone. Alternatively, all zones could have sensors and become master zones. No fine tuning factors would be required under those circumstances.

The SIC 10 compares the computed master zone run time to a pre-selected minimum runtime variable. Minimum runtime may be adjustable and may range from two minutes to six minutes. If the computed master zone runtime is less than the minimum runtime value, that zone and all its subordinate zones will not be scheduled to run. If the computed master zone runtime is greater than or equal to the minimum runtime value, that master zone and its subordinate zones will be scheduled to run for a length of time, in minutes and seconds, equal to their adjusted runtimes.

Zones scheduled to run may preferably run in the following order: The master zone 3 associated with Sensor 18; any other zones associated with Sensor 18 sequentially in numerical order; the master zone 6 associated with Sensor 20; and any other zones associated with Sensor 20 sequentially in numerical order.

Whenever the scheduled adjusted runtime for a zone exceeds a pre-set runtime (e.g. 3 minutes), irrigation for the zone may be split into multiple runs of fewer minutes. Multiple runs for a single zone are preferably separated by at least 21 minutes. This allows the possibility that the other seven zones may run for three minutes each, but even if no other zones run, this time is preferably kept constant. The runs may occur in the order described above.

5) Modification of the MC/WN Tables

When all scheduled zones have exhausted their assigned adjusted runtimes, an irrigation cycle is complete. At a predetermined time (e.g. on the order of two hours) after completion of the irrigation cycle of a zone group, the associated sensor 18 or 20 is read to determine the moisture content of the soil following irrigation. The planned delay after irrigation is used to allow the water applied during irrigation to percolate into the soil so as to approximate the full contribution of the watering cycle at the sensor level. The SIC 10 then compares the post-irrigation sensor voltages of each group to their respective target voltages to determine how successful the irrigation was with respect to bringing the soil to the desired level of moisture content.

If a post-irrigation sensor reading is within a predetermined approximation (e.g. a value between 0.01 and 0.2 V or more) of target voltage, the irrigation cycle is considered to have successfully brought the soil to the desired level of moisture content. In that case, the portion of the MC/WN table used to determine the zone runtimes is regarded as accurate. The table entry used requires no change.

If a post-irrigation sensor reading results in a value indicating less moisture content than desired and the sensor voltage differs from target voltage by more than the predetermined approximation, the portion of the MC/WN table used to determine the zone runtime for that sensor voltage is considered to be improvable. It is improvable in the sense that the runtime necessary to bring the soil to the desired level of moisture content predicted by the table was not long enough. In order to achieve the improvement, the table entry that was used to determine the runtime is modified. Specifically, the runtime value for that entry is increased by a fixed increment (e.g. one minute), by a calculated proportional amount (see equation (2) in Section E.5)b) hereof), by a combination of the two, or by some other scheme.

The above-described modification of a table entry may have illogical consequences. For example, increasing the runtime of one table entry may leave an adjacent drier entry with a shorter runtime. Since this does not make sense, any modification of an entry is followed by whatever modifications of adjacent entries are necessary to prevent the illogical condition from occurring.

Similarly, if the post-irrigation sensor reading results in a value indicating more moisture content than desired, and the value differs from target voltage by more than a predetermined amount (e.g. a value between 0.01 and 0.2 V or more), the portion of the MC/WN table used to determine the zone runtimes is considered to be improvable. In this case, it is improvable in the sense that the runtime necessary to bring the soil to the desired level of moisture content predicted by the table was too long. In order to achieve the improvement, the runtime value in the entry that was used to determine the zone runtimes is decreased by a fixed decrement (e.g. one minute), by a calculated proportional amount (see equation (2) in Section E.5)b) hereof), by a combination of the two, or by some other scheme. Additional modifications to prevent illogical conditions in adjacent entries are then made as described above.

In this manner, values in the MC/WN table are improved dynamically as a result of feedback following each irrigation cycle. Thus, over time, the function table will more precisely reflect the varying actual water needs of its irrigated area.

6) Irrigation Schedules

As discussed above, the determination of how much water to apply during an irrigation cycle is automatically made using the MC/WN functions. The timing of the irrigation cycles, however, follows one of several user-selectable irrigation schedules. In order to properly schedule irrigation cycles at specific times, the SIC 10 maintains the current time and date and accepts user input as follows:

a) Start Time

Figure 4B:
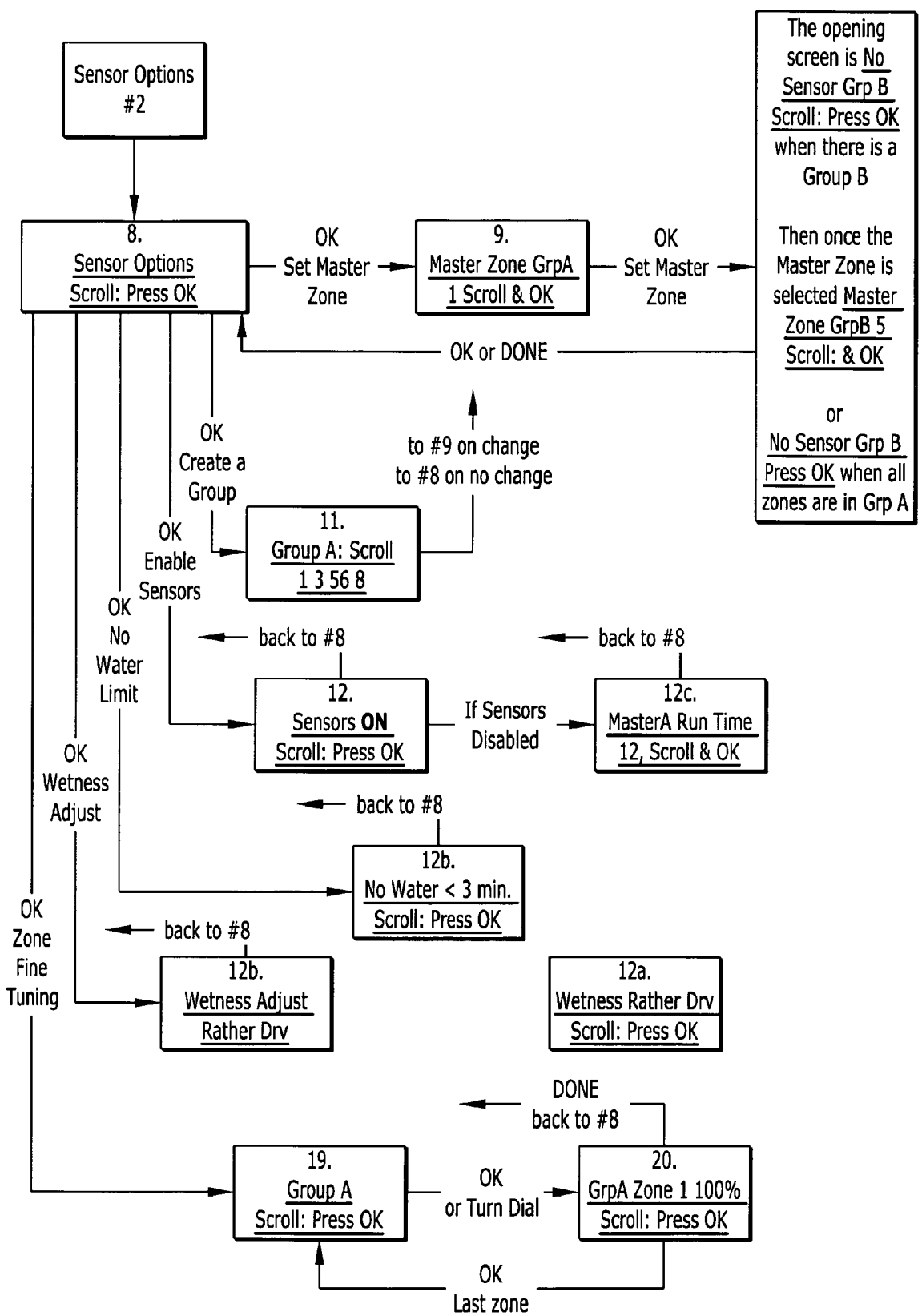
Figure 4C:
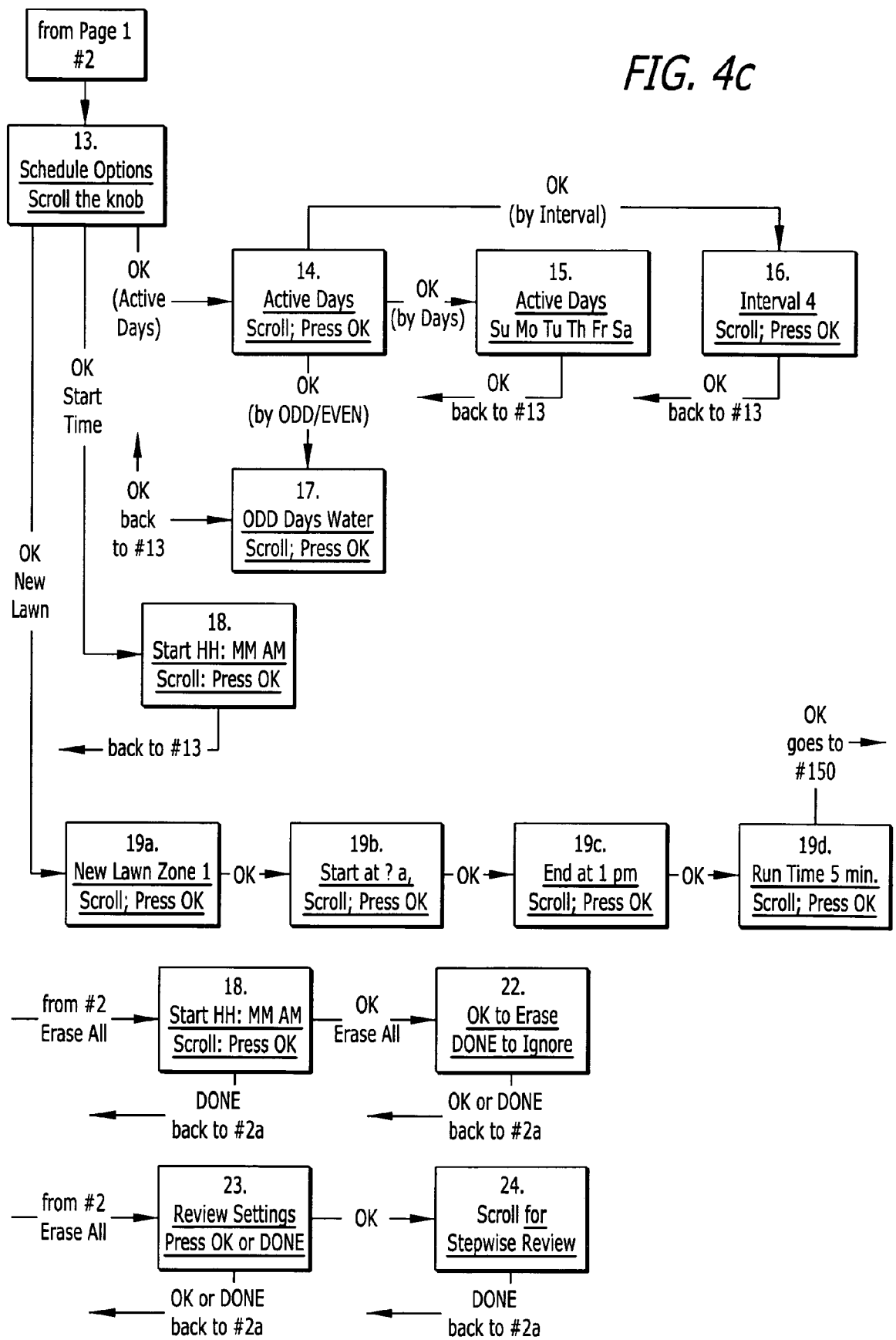
Figure 4D:
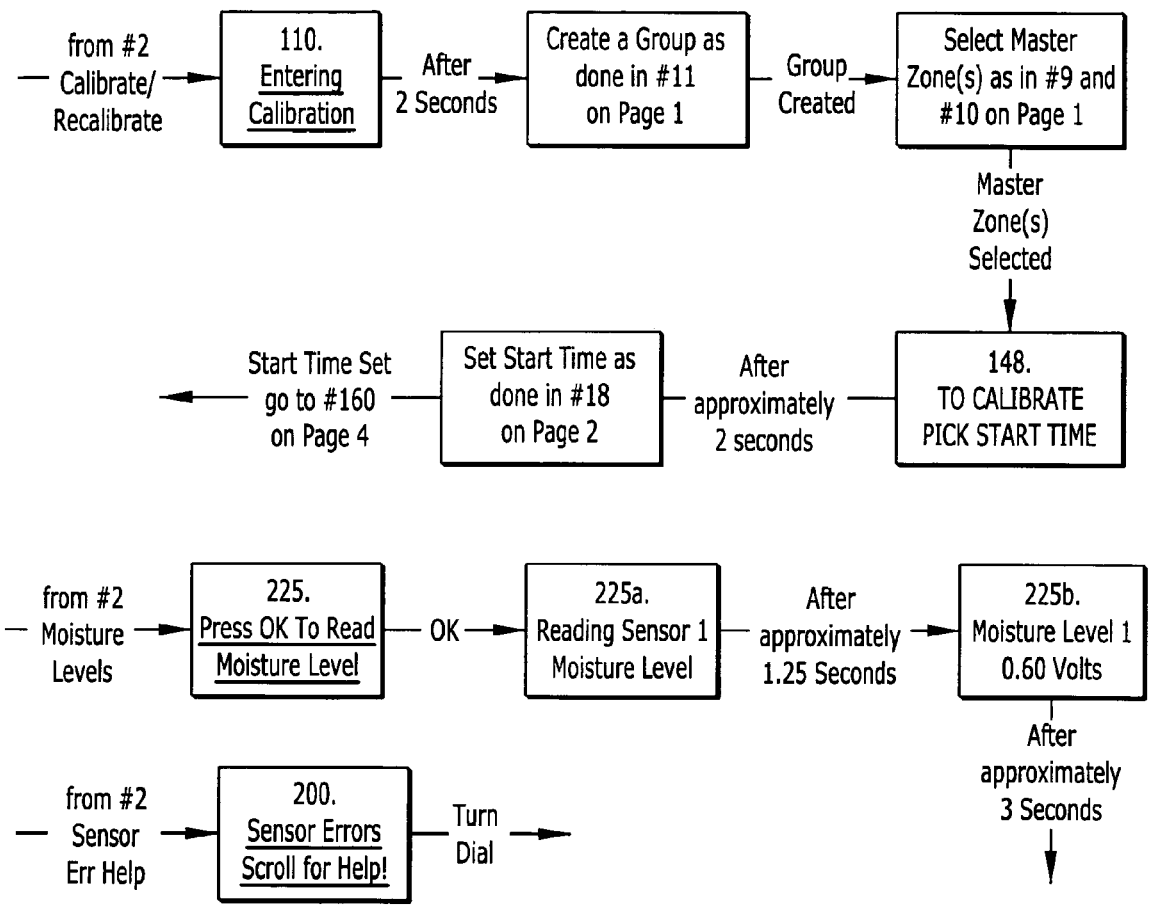
Figure 4E:
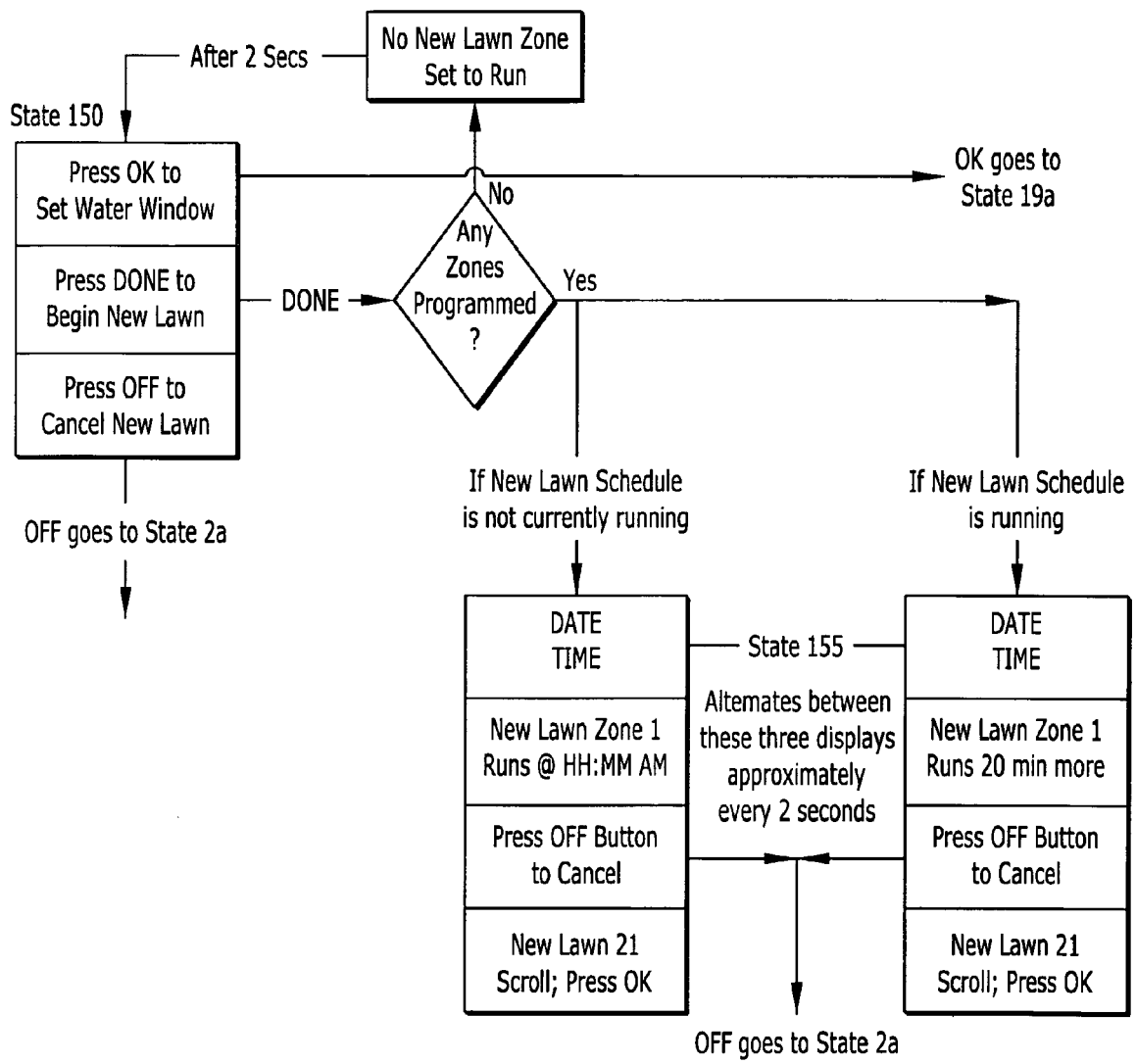
FIG. 4e is a flow chart of the new lawn process of the inventive controller.
Figure 4F:
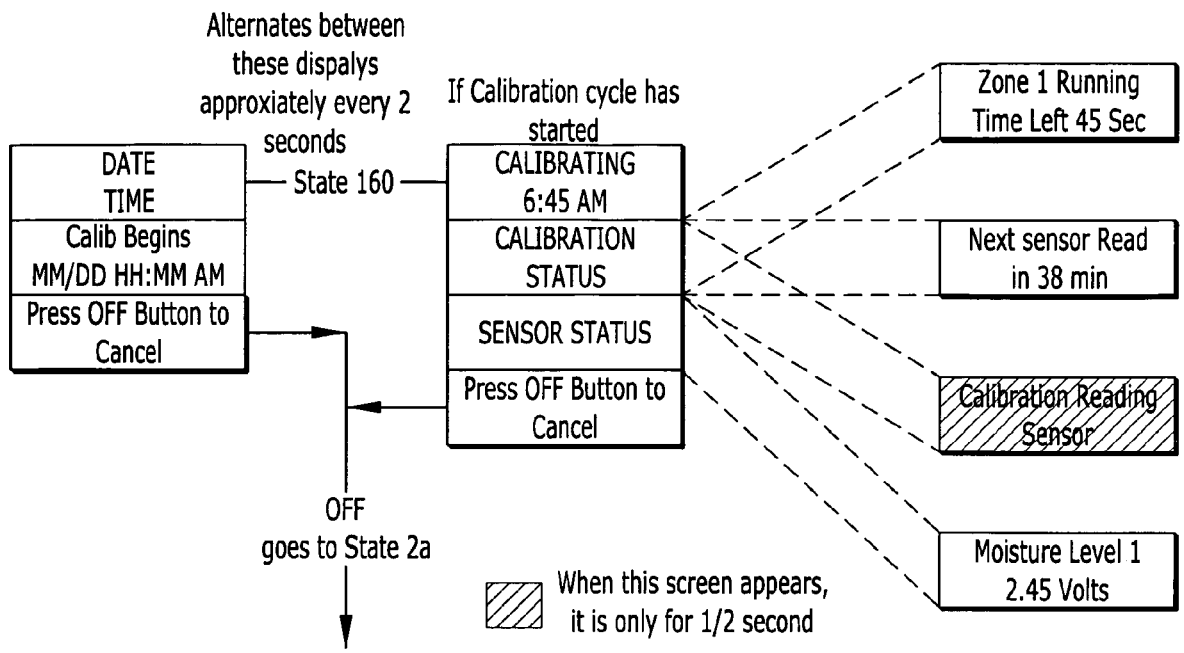
FIG. 4f is a flow chart of the calibration process.
Figure 4G:
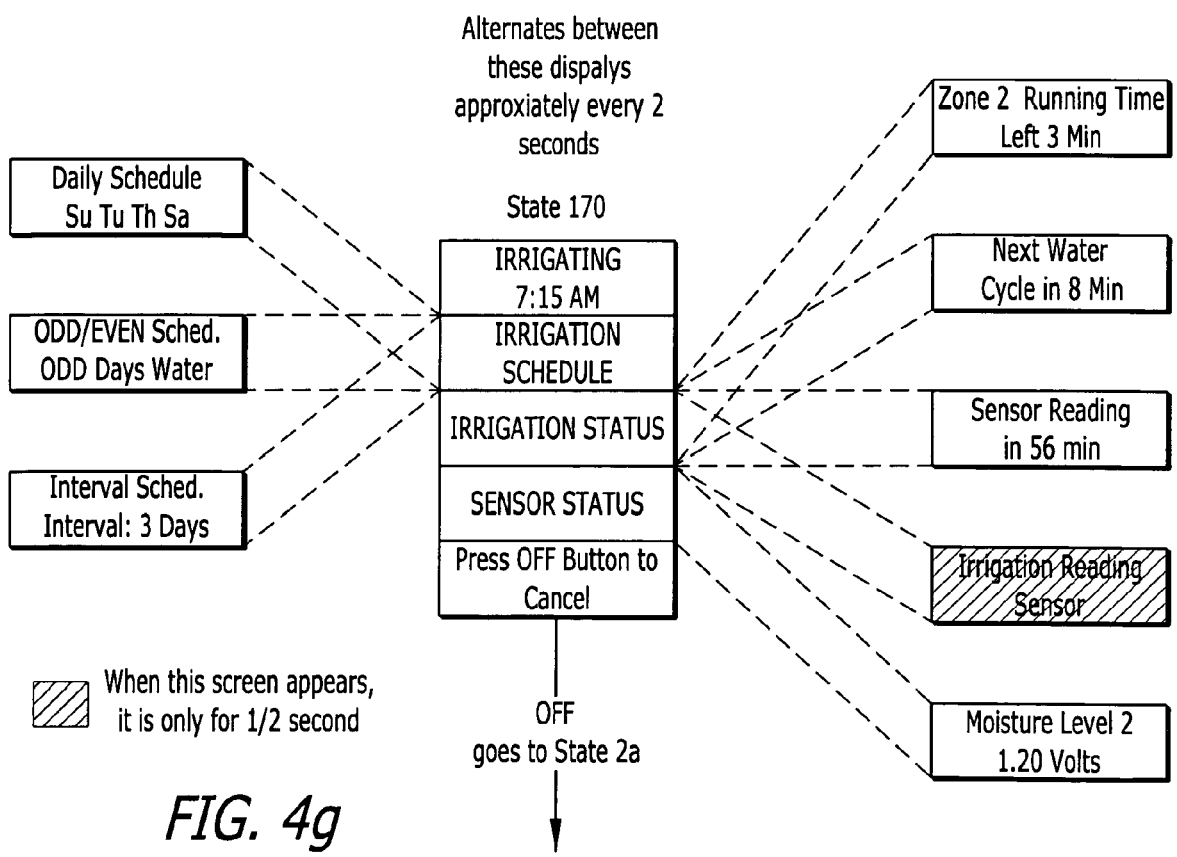
FIG. 4g is a flow chart of the irrigation scheduling process.
Figure 4H:
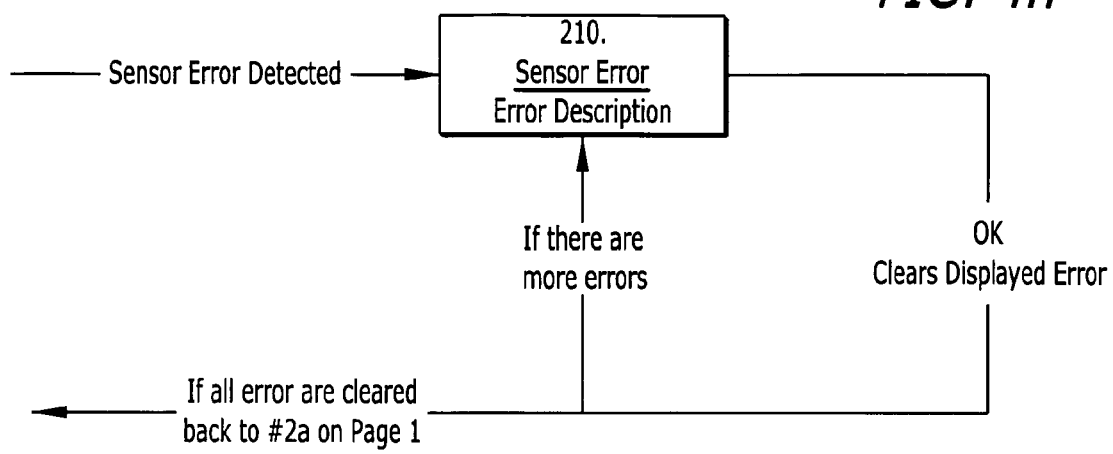
FIG. 4h is a flow chart of the sensor error screen process.
Figure 5:
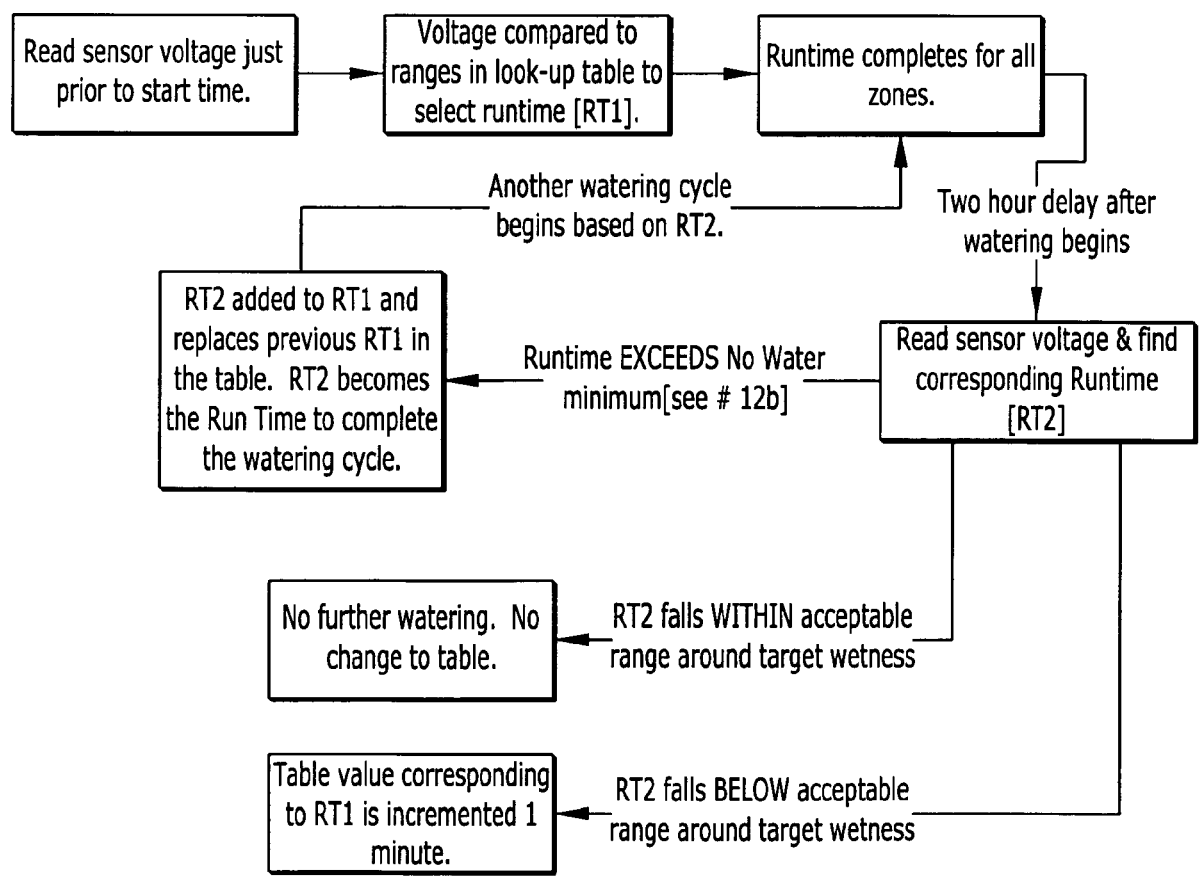
FIG. 5 is a flow chart of the table adjustment process.

The start time referred to in FIGS. 4c and d is the time of day when an irrigation cycle will begin. Most of the irrigation schedules illustrated in FIG. 4c require specification of a start time. The default start time is 6:00 a.m., but the start time can be changed to any desired hour and minute of the day.

b) Daily Schedule

A daily schedule allows irrigation cycles to occur at the start time only on selected days of the week. The user can select any or all days for irrigation.

c) Odd/Even Schedule

An odd/even schedule allows irrigation cycles to occur at the start time only on odd or even days of the month. An odd schedule never waters on the $31^{st}$ day of the month or the $29^{th}$ of February.

d) Interval Schedule

An interval schedule allows irrigation cycles to occur at the start time only after a specified number of days have passed since the last irrigation cycle. The number of days between irrigation cycles is the irrigation interval.

e) New Lawn Schedule

The new lawn schedule provides a method to meet the special irrigation requirements of newly seeded areas. The new lawn schedule differs from the daily, odd/even, and interval schedules in that the zone runtimes are specified as part of the schedule itself, not automatically determined by the MC/WN table. Within the framework of the new lawn schedule, each zone may be assigned a runtime and a number of consecutive start times. Zone runtimes may range from 0 to 20 minutes on minute boundaries. The selectable initial start time for a zone may be set on any hourly boundary. Following the initial start time, the zone will run every hour until reaching the last start time which can be set on any hourly boundary. The 0 minute runtime is necessary in order to disable a zone from running. This is preferably the default so that zones will not run unless the user specifically selects a runtime. Each time the zone runs, it runs for the specified runtime.

f) Manual Schedule

In addition to the automatic irrigation schedules, the user can initiate a manual schedule at any time. A manual schedule runs any selected zone individually or all zones sequentially for 5 minutes, a value that can be altered. At any time while the manual schedule is running all the zones, the user can advance irrigation to the next zone by pushing the "OK" button 34 (FIG. 2).

7) Excessive Dryness Protection

If, due for example to a malfunction of the irrigation system or sensor, a reading of a sensor results in a voltage at or beyond the extreme range of a properly operating sensor, say 5 volts for our particular example, an excessive dryness audible alarm will sound and the display will flash the error message. Until corrective action is taken on the alarm or the fault condition corrects itself, a timed (e.g. ten-minute) default watering cycle may be used to prevent loss of vegetation.

If the average sensor reading before irrigation is 5 volts, it is handled as described below under Sensor Disconnect. If the average sensor reading before irrigation is less than 5 volts but greater than the top of the MC/WN table, the table is expanded as discussed in Section E.5)a) hereof and there is no error indication. It is possible, however, to get an 'Extreme Dryness' sensor error under the following conditions: If it is not a Water Day but the average sensor reading at the designated Start Time indicates a value in the last (driest) runtime table entry or a value greater than the top of the runtime table, an 'Extreme Dryness' error will be indicated. If the irrigation schedule in effect is a Daily or Interval schedule, irrigation will occur even though it is not a Water Day, with the 'Extreme Dryness' error being displayed after the completion of the irrigation cycle. If the irrigation schedule in effect is an Odd/Even schedule, no irrigation will occur and the 'Extreme Dryness' error will be indicated immediately.

8. Sensor Disconnect

If the average sensor reading before irrigation ever results in a voltage indicating that a sensor, e.g. sensor 18 associated with Group A, is disconnected, the maximum value from the runtime table is used as an irrigation runtime. At the completion of the irrigation cycle, the SIC 10 will flash an error message, e.g.

```
Sensor 1 Error
Sensor Not Found
```

C. User Interface

The basic user interface of the SIC 10 (FIG. 2) involves interaction with an LCD display 30, a rotary dial or knob 32, and three control buttons 34, 36 and 38, all of which are located on the faceplate 40 of the SIC 10.

The LCD display 30 may be a two-line display capable of displaying up to twenty-four characters per line. Display 30 characters include the standard alphanumeric set as well as several special graphical characters.

The rotary dial 32 is used to change options and values being displayed on the LCD display 30. The absolute position of the dial 32 is not significant. Its action arises from its rotation and direction of rotation. For example, rotating the dial 32 in a clockwise direction increases a numeric value, and rotating the dial 32 in a counterclockwise direction decreases a numeric value. Similarly, clockwise rotation of the dial 32 scrolls through a list of options in the opposite order from counterclockwise rotation.

The control buttons 34 through 38 are used to select options and values and to navigate through the various user interface displays and menus. Specifically, the "OK" button 34 is used to select among options and values; the "OFF" button 36 turns off any ongoing irrigation, and in some instances is used to complete a user interface function; and the "DONE" button 38 is used to complete a user interface function and to return to a previous menu or display 30. Pressing "DONE" typically causes the SIC 10 to step backward through the menu levels, much like the Escape key does on a personal computer.

As seen in FIG. 3, the dial 32, the buttons 34 through 38, and the readings of sensors 18 and 20 are the inputs to a microcontroller 42 which is driven by a clock 44. The microcontroller 42 operates the zone valves 46a through 46h which control the watering of the zones 1 through 8 in accordance with the MC/WN function tables 48a and 48b for zone groups A and B. respectively, stored in the nonvolatile memory 50. The microcontroller 42 also operates the display 30 and ancillary functions (not shown) such as alarms.

D. Interface States and Functions

The user-selectable parameters of the SIC 10 are set in response to a sequence of instructions displayed on the display 30. These instructions, and the effect of the user's responses thereto, are illustrated in the flow chart of FIGS. 4 a-i. The interface state and function descriptions listed below follow the flow paths and instruction boxes depicted in that chart.

1) Power Up state

On power up, the display 30 appears as illustrated here:

```
POWER UP RESET
PRESS ANY BUTTON
``` with the first line blinking on and off. This display 30 remains until one of the control buttons 34 through 38 is pushed. Pushing one of the control buttons causes a transition to state 1a (Set Time and Date) of FIG. 4a.

2) Default Time Out state

Whenever the SIC 10 is not in the Power Up state described above, and there is no activity involving the rotary dial 32 or the control buttons 34-38 for a period of one minute, the SIC 10 automatically enters the Default Time Out state. When in the Default Time Out state, the LCD 30 alternates between displays indicating the current state of the moisture sensors 18, 20, the date of the next irrigation cycle, the time of day, and the zone (if any) currently running. While the SIC 10 is in the calibration or irrigation cycle, these displays are replaced by the calibration screens of FIG. 4f or the irrigation screens of FIG. 4g, respectively. Prior to calibration, the current state of the moisture sensors is displayed based on a default field capacity value.

Figure 6:
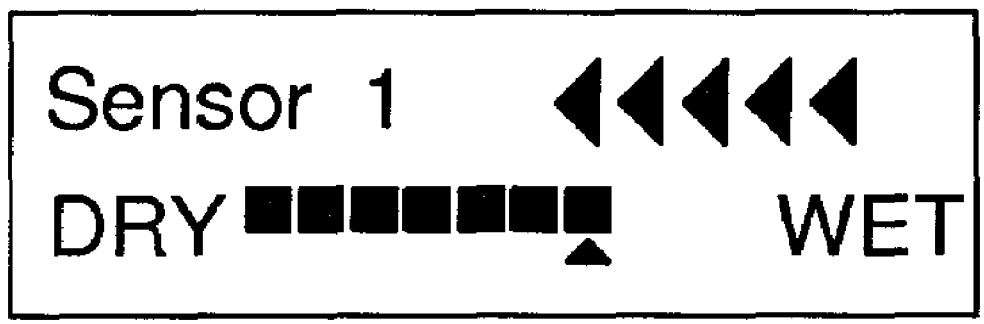
FIG. 6 represents an example of the display showing moisture sensor status; and, FIG. 7 represents an example of the display showing the scheduled date of the next irrigation cycle.

FIG. 6 represents an example of the display 30 showing moisture sensor status. The top line indicates which sensor (e.g. sensor 18) is being described and shows a series of directional symbols. Changes in the soil's moisture content are monitored by periodically reading the sensors (for example, every 6 minutes). As sensor readings are taken, an average sensor reading is maintained (for example, a rolling average of the last 10 readings, i.e. the average reading over the past hour). The directional symbols in the above illustration reflect changes in moisture content by comparing the most recent sensor readings with the average sensor readings. The directional symbols point to the left and scroll right to left if the most recent sensor readings indicate lower moisture content than the average sensor readings. The directional symbols point to the right and scroll left to right if the most recent sensor readings indicate higher moisture content than the average sensor readings. If the most recent sensor readings indicate the same level of moisture content as the average sensor readings, directional symbols are not displayed. In this way, the directional symbols provide a general indication of whether the soil's moisture content is increasing or decreasing.

The bottom line provides a graphical representation of the current sensor reading on a DRY to WET scale. The position of the target level of moisture content is also shown on the DRY to WET scale using a caret symbol below the current sensor reading. The inclusion of the target level position is informative in that irrigation would generally be expected when the current sensor reading falls below the Target Level.

The legends WET or DRY flash if the sensor reading is off scale.

Figure 7:
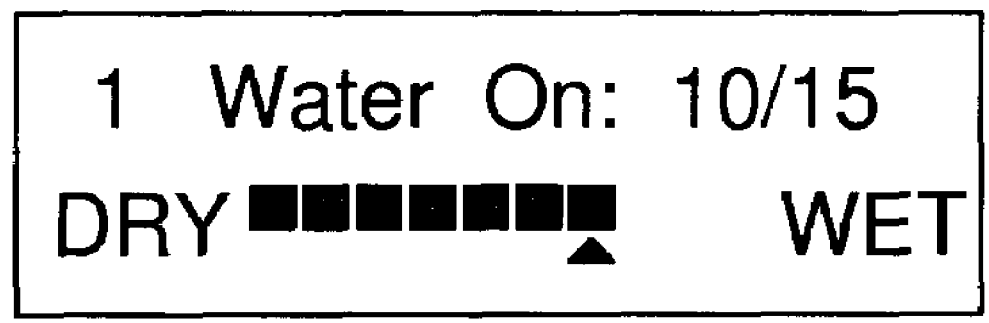

FIG. 7 represents an example of the display 30 showing the scheduled date of the next irrigation cycle (the next irrigation cycle is based on user-selectable options as described in Section D.8) hereof). The top line indicates which sensor is being described and shows the predicted date of the next irrigation cycle. The bottom line remains the same showing the current sensor reading and the target level.

While the SIC 10 is in the Default Time Out state, these two displays continue to alternate automatically; first for sensor 18, then for sensor 20. If the dial 32 is rotated while in the Default Time Out state, these displays can be alternated manually. When the displays are alternated manually, the display 30 shown in subsection 3) below is added to the others, thus providing access to the General Options state described next. Pressing the "OK" or "DONE" buttons 34 or 38 while in the Default Time Out state provides another means of accessing the General Options state.

3) General Options state

The General Options state is the basic user interface state; i.e. the state from which all user interface functions are accessed. The first display 30 of the General Options menu is as follows:

```
General Options
Press OK
```

When the "OK" button is pushed, the display 30 changes to read:

```
Scroll; Press OK
System On/Off
``` where the first line describes how to select an option, and the second line shows one of the following ten options:

System On/Off
Manual On
Set Clock
Sensor Options
Set Schedule
Erase All
Review
Calibrate/Recalibrate
Moisture Levels
Sensor Err Help Rotating the dial 32 clockwise causes the options in the list to be displayed from top to bottom, while rotating the dial 32 in a counter-clockwise direction causes the options in the list to be displayed from bottom to top.

This is the General Options menu from which all user interface functions can be reached. These functions are described next.

a) Turning the System on/Off

Selecting "System On/Off" from the General Options menu produces the following indication on display 30:

```
System is ON
Scroll, Press OK
```

The top line indicates the current status of the system: On or Off. The system status is blinking to indicate that it will change if the dial 32 is rotated. A blinking LED 33 may also be provided on the control panel of FIG. 2. Rotating the dial 32 toggles the value between ON and OFF. Pressing the "OK" button 34 turns the system on or off according to the status being displayed, and returns to the General Options menu.

b) Manual Watering

Selecting "Manual On" from the General Options menu produces the Manual Irrigation menu illustrated here:

```
ALL
Scroll; Press OK
```

The word ALL in the top line may be blinking to indicate a value that will change when the dial 32 is rotated. Rotating the dial 32 successively displays one of the following values at the blinking location:

ALL
1
2
3
4
5
6
7
8

Pushing the "OK" button 34 when one of the zone numbers is displayed, initiates manual irrigation for that zone and produces the display 30 illustrated here

```
Stop Zone 1
Press OFF
``` where the zone number displayed is the zone currently irrigating. Pressing the "OFF" button 36 will terminate the irrigation. If the "OFF" button 36 is not pushed, the irrigation will terminate automatically after five minutes.

Pushing the "OK" button 34 when the value "ALL" is displayed begins a manual irrigation sequence in which each of the eight zones will irrigate for five minutes, beginning with zone 1, and which produces the following display 30:

```
1, OFF Stops All
OK for next Zone
```

The "1" displayed on the top line indicates the number of the zone currently irrigating. If the "OFF" button 36 is pressed, the manual irrigation sequence is terminated. If the "OK" button 34 is pressed, manual irrigation moves to the next sequential zone. If the "OK" button 34 is pressed when zone 8 is irrigating, the manual irrigation sequence is terminated.

Whenever the irrigation sequence is terminated, the display 30 returns to the General Options menu.

c) Setting Time and Date

Selecting "Set Clock" from the General Options menu produces the Time menu illustrated here:

```
12:00 AM
Scroll; Press OK
``` with the hour portion of the top line blinking to indicate that the hours value will change when the dial 32 is rotated. By rotating the dial 32, the hours can be set. Pressing the "OK" button 34 accepts the value for the hours and moves the focus to the minutes value. The minutes value blinks indicating that it will change when the dial 32 is rotated. By rotating the dial 32, the minutes can be set. Pressing the "OK" button 34 accepts the value for minutes and moves the focus to the AM/PM value. The AM/PM value blinks and can be changed by rotating the dial 32. Pressing the "OK" button 34 accepts the AM/PM value and produces the Date menu illustrated here:

```
JAN 01 2005
Scroll; Press OK
``` with the month portion of the top line blinking to indicate that it will change when the dial 32 is rotated. By rotating the dial 32, the month can be set. Pressing the "OK" button 34 accepts the month value and moves the focus to the day. The day value blinks indicating that it will change when the dial 32 is rotated. By rotating the dial 32, the day can be set. Pressing the "OK" button 34 accepts the day value and moves the focus to the year. The year value blinks, indicating that it will change when the dial 32 is rotated. By rotating the dial, the year can be set. Pressing the "OK" button 34 accepts the year and returns the display 30 to the General Options menu.

At any time during the process of setting the time and date, the "DONE" button 38 can be pressed to return to the General Options menu.

d) Setting Sensor Options

Selecting "Sensor Options" from the General Options menu produces the Sensor Options menu illustrated here.

```
Sensor Options
Scroll; Press OK
```

Rotating the dial 32 scrolls through the following list of sensor options:

Set Master Zone
Create a Group
Zone Fine Tuning
Enable Sensors
Wetness Adjust
No Water Limit i) Setting the Sensor Master Zone Selecting "Set Master Zone" from the Sensor Options menu produces the Master Zone display 30 illustrated here.

```
Master Zone GrpA
1, Scroll, & OK
```

The numeric value on the left of the bottom line indicates the currently assigned master zone for group A (Sensor 18), and it is blinking to indicate that it will change when the dial 32 is rotated. Rotating the dial 32 will change the displayed zone number in the range 1-8. Pressing the "OK" button 34 will accept the displayed zone number as the master zone for group A and produce the group B (Sensor 20) master zone display 30 illustrated below (if there is no sensor assigned to group B, all zones are automatically assigned to group A):

```
Master Zone GrpB
2, Scroll, & OK
``` which reacts like the group A display 30 described above. Group B cannot use the same zone as group A for its master, nor can any zone belong to more than one group.

ii) Creating a Sensor Group

Selecting "Create a Group" from the sensor options menu produces the type of display 30 illustrated here:

```
Group A
1 2 3 4
``` where the top line indicates that the zone numbers displayed are the zones assigned to group A and the bottom line displays the numbers of the zones assigned to group A. If all eight zones are assigned to group A, the top line becomes Group A All ON If no zones are assigned to group A, the top line becomes Group A All OFF Rotating the dial 32 produces a series of choices on the top line allowing any or all zones to be added or deleted from the group. For example, if zones 1, 2, 3 and 4 are currently assigned to group A as illustrated in the example display 30 above, the series of choices would be OK=Accept As Is
OK=1 OFF
OK=2 OFF
OK=3 OFF
OK=4 OFF
OK=5 ON
OK=6 ON
OK=7 ON
OK=8 ON
OK=All ON
OK=All OFF The options are such that zones currently in the group can be removed, and zones not in the group can be added. The list of choices changes dynamically as zones are added and removed from group A.

Any zone not included in group A is automatically assigned to group B. At any time during zone assignment, the "DONE" button 38 can be pushed to return to the Sensor Options menu.

iii) Setting Zone Fine Tuning Factors

Selecting "Zone Fine Tuning" from the Sensor Options menu produces the Zone Fine Tuning menu illustrated here:

```
Group A
Scroll; Press OK
```

Rotating the dial 32 produces the following display 30:

```
GrpA Zone 1 100%
Scroll; Press OK
``` with the fine tuning percentage value blinking to indicate that it will change when the dial 32 is rotated. By rotating the dial 32, the fine tuning percentage can be adjusted in the range of, e.g., 10% to 140%. Pressing the "OK" button 34 accepts the displayed value as the fine tuning factor for that zone and moves to the next zone assigned to group A. When fine tuning factors for all group A zones have been displayed, group B zones are displayed in a similar fashion. If the fine tuning factor being displayed is the fine tuning factor for a master zone (whose percentage is by definition 100%), the following is displayed:

```
GrpA Master Zone
Scroll; Press OK
```

At any time during the process of setting Fine Tuning Factors, the "DONE" button 38 can be pressed to return to the Sensor Options menu.

iv) Enabling and Disabling Sensors

Selecting "Enable Sensors" from the Sensor Options menu produces the display 30 illustrated here:

```
Sensors On
Scroll; Press OK
``` where the ON/OFF value on the top line indicates the current enable status of the sensors. The ON/OFF value is blinking to indicate that it will change when the dial 32 is rotated. Rotating the dial 32 toggles the ON/OFF value. Pushing the "OK" button 34 accepts the selected value as the sensor enable status and returns the display 30 to the Sensor Options menu.

If the sensors 18, 20 are disabled, the next display 30 allows for selection of the run time for the master zone of group A. The run time flashes as shown below in bold, then repeats for Group B if a second sensor is installed.

```
Master A Run Time
15, Scroll & OK
```

After selecting a run time with dial 32 and pushing the "OK" button 34, the display 30 returns to the Sensor Options menu.

v) Adjusting the Target Level of Wetness

Selecting "Wetness Adjust" from the Sensor Options menu produces a display 30 with the following top line:

Wetness Adjust

The second line of the display 30 is one of the following options:

Wettest

Rather Wet

Mid-Range

Rather Dry

Driest depending upon the current setting of the Wetness Adjust variable. The empirically calculated default target voltage $S_t$ representing the level of moisture considered optimal for plant support (discussed in Section B.3) above) can be adjusted by choosing from among these five options. The 'Wettest' setting leaves the target wetness unchanged (at 1 Table Delta from field capacity). The 'Rather Wet' setting adjusts the target wetness to be ½ a Table Delta drier (or 1½ Table Deltas from field capacity). The 'Mid-Range' setting adjusts the target wetness to be 1 Table Delta drier (or 2 Table Deltas from field capacity). The 'Rather Dry' setting adjusts the target wetness to be 1½ Table Deltas drier (or 2½ Table Deltas from field capacity). The 'Driest' setting adjusts the target wetness to be 2 Table Deltas drier (or 3 Table Deltas from field capacity).

vi) Setting the No Water Limit

Selecting "No Water Limit" from the Sensor Options menu produces the display 30 illustrated below:

```
No Water < 2 Min
Scroll; Press OK
``` where the numeric value on the top line indicates the current no water limit, i.e. the computed run time limit below which no watering will take place. The no water limit value is blinking to indicate that it will change when the dial 32 is rotated. Rotating the dial 32 will adjust the no water limit value within the range of, e.g., 2 minutes to 6 minutes in one-minute increments. Pressing the "OK" button 34 accepts the displayed value as the no water limit and returns the display 30 to the Sensor Options menu.

e) Setting Schedule Options

Selecting "Set Schedule" from the General Options menu produces the Schedule Options menu illustrated here:

```
Schedule Options
Scroll the Knob
```

Rotating the dial 32 replaces the second line by scrolling through the following list of schedule options:

Active Days

Start Time

New Lawn i) Selecting Active Days

Active days are those days on which irrigation can occur. Selecting "Active Days" from the Schedule Options menu produces the Active Days menu shown below:

```
Active Days
Scroll; Press OK
```

Rotating the dial 32 replaces the second line by scrolling through the following list of Active Days options:
By Days
By Interval
By Odd/Even
Setting Active Days by Days
Selecting "By Days" from the Active Days menu produces the type of display 30 illustrated here:

```
Active Days
Su TuWe FrSa
``` where the bottom line indicates the currently selected active days of the week. If all days of the week are selected, the top line becomes:
Days All On
If no days of the week are selected, the top line becomes:
Days All Off
Rotating the dial 32 produces a series of choices on the top line allowing for any or all days of the week to be added or deleted from the list of active days. For example, if the active days are Sunday, Tuesday, Wednesday, Friday and Saturday as illustrated in the example display 30 above, the series of choices would be:
OK=Accept as is
OK=Sun OFF
OK=Mon ON
OK=Tue OFF
OK=Wed OFF
OK=Thu ON
OK=Fri OFF
OK=Sat OFF
OK=All ON
OK=All OFF The options are such that currently selected active days can be removed from the list and active days not on the list can be added. The list of choices changes dynamically as active days are added and removed.

Pressing the "OK" button 34 in this menu selects a daily schedule as the current irrigation schedule.

At any time during the By Days selection, the "DONE" button 38 can be pushed to return to the Schedule Options menu.

Setting Active Days by Interval

Setting active days by interval requires choosing the number of days between irrigation cycles.

Selecting "By Interval" from the Active Days menu produces the display 30 illustrated here:

```
Interval 3
Scroll; Press OK
``` in which the numeric value on the top line indicates the current setting for the irrigation interval between active irrigation days. The irrigation interval value blinks to indicate that it will change when the dial 32 is rotated. Rotating the dial 32 will adjust the irrigation interval within the range of, e.g., 1 day to 7 days. Pressing the "OK" button 34 accepts the displayed value as the irrigation interval, selects interval scheduling as the current irrigation schedule, and returns to the Schedule Options menu.

Pressing the "DONE" button 38 during this process will return directly to the Schedule Options menu without changing the active day interval or changing the irrigation schedule to an interval schedule.

Setting Active Days by Odd/Even

Selecting active days by odd/even requires selecting either odd or even days of the month to be the active irrigation days. If odd days are selected, irrigation will not occur on the $31^{st}$ day of the month or on the $29^{th}$ of February.

Selecting "By Odd/Even" from the Active Days menu produces the following display 30:

```
ODD Days Water
Scroll; Press OK
``` where the ODD/EVEN value on the top line indicates the current setting for an odd/even irrigation schedule. The ODD/EVEN value is blinking to indicate that it will change when the dial 32 is rotated. Rotating the dial 32 toggles the ODD/EVEN value. Pressing the "OK" button 34 accepts the displayed value as the odd/even schedule setting, selects an odd/even schedule as the current irrigation schedule, and returns to the Schedule Options menu.

Pushing the "DONE" button 38 during this process returns directly to the Schedule Options menu without changing the odd/even schedule setting or selecting an odd/even schedule as the current irrigation schedule.

ii) Setting the Start Time

Selecting "Start Time" from the Schedule Options menu produces the start time menu illustrated here

```
Start: 12:00 AM
Scroll; Press OK
``` with the hour portion of the start time blinking to indicate that the hour value will change when the dial 32 is rotated. By rotating the dial 32, the hour can be set. Pressing the "OK" button 34 accepts the hour value and moves the focus to the minutes value. The minutes value blinks indicating that it will change when the dial 32 is rotated. By rotating the dial 32, the minutes can be set.

Pressing the "OK" button 34 accepts the value for minutes and moves the focus to the AM/PM value. The AM/PM value blinks and can be changed by rotating the dial 32. Pressing the "OK" button 34 accepts the AM/PM value and returns to the Schedule Options menu.

At any time during the process of setting the start time the "DONE" button 38 can be pressed to return to the Schedules Options menu.

iii) Setting a New Lawn Schedule

Selecting "New Lawn" from the Schedule Options menu to accommodate a newly seeded or sodded lawn produces the New Lawn menu illustrated here:

> New Lawn Zone 1
> Scroll; Press OK where the zone number on the top line is blinking to indicate that it will change when the dial 32 is rotated. Rotating the dial 32 adjusts the zone number from 1 to 8. Pressing the "OK" button 34 selects the new lawn schedule for the displayed zone and produces the Initial Start Time menu illustrated here > Start at 6AM
> Scroll; Press OK with the start time value on the top line blinking to indicate that it will change when the dial 32 is rotated. By rotating the dial 32, the initial start time can be adjusted over the entire 24-hour range. Pressing the "OK" button 34 accepts the displayed start time value as the initial start time for the selected zone and produces the End Time display 30, which is used to stop the repeat watering cycles characteristic of a new lawn schedule. That display 30 is illustrated here:

> End at 4PM
> Scroll; Press OK with the end time value on the top line blinking to indicate that it will change when the dial 32 is rotated. By rotating the dial 32, the end time can be adjusted over the entire 24-hour range as well. Because selecting the same Start At and End At time for a zone is a valid but ambiguous choice, it must be possible to disable a zone so it does not run as part of the new lawn schedule. To that end, a runtime of 0 minutes is made the default for all zones, and the user can then enter runtimes for the zones to water as part of the new lawn schedule. Pressing the "OK" button 34 accepts the displayed time value as the end time for the selected zone and produces the Runtime menu illustrated here > Run Time 10 min.
> Scroll; Press OK with the runtime value on the top line blinking to indicate that it will change when the dial 32 is rotated. By rotating the dial 32, the runtime value for the repetitive hourly runs of the new lawn schedule can be adjusted in the range of, e.g., 1 minute to 30 minutes. Pressing the "OK" button 34 accepts the displayed runtime value as the new lawn runtime for the selected zone and may produce the following grow-in screen:

> New Lawn 21 days
> Scroll; Press OK

This screen sets the number of days the new lawn schedule will run before the SIC 10 switches to the start-up wizard and calibration described in Sections E.2) and 3) below, and begins the regular schedule set as described above. This switch may occur at a predetermined time, e.g. 6 a.m., on the day following the selected number of grow-in days. A default value such as 21 days may be suggested and may be varied by scrolling. Pressing "OK" after setting the new lawn parameters produces the following sequence of screens alternating at, e.g., two-second intervals:

> Press OK to
> Set Water Window

> Press DONE to
> Begin New Lawn

> Press OFF to
> Cancel New Lawn

Pressing OK during any of these screens returns the program to the start of this Section to program the next zone. Pressing DONE during any of these screens, provided any zone has been programmed for a run time greater than 0, starts the entered new lawn schedule and overrides any other schedule for the programmed zones. At that time, the sequence of screens changes to, e.g.:

> Jan. 6, 2004
> 12:13 PM

> New Lawn Zone 1
> Runs @ 1:00 PM

> Press OFF to
> Cancel New Lawn

> New Lawn
> 21 Days Left

The second of these screens always indicates the next zone to run. While a zone is running, its second line changes to, e.g., "Runs 3 min more". Pressing OFF at any time cancels all new lawn programs and returns control to the selected schedule options.

f) Restoring the Default Settings

Selecting "Erase All" from the General Options menu produces the display 30 illustrated here:

> Erase All
> Press OK or DONE

Pressing the "DONE" button 38 returns the program directly to the General Options menu.

Pressing the "OK" button 34 produces the following display 30:

```
OK to Erase
DONE to Ignore
```

Pressing the "OK" button 34 restores all schedule and irrigation variables to their default settings and then returns to the General Options menu.

Pressing the "DONE" button 38 also results in a return to the General Options menu but leaves all schedule and irrigation variables unchanged.

g) Reviewing Current Settings

Selecting "Review" from the General Options menu produces this display 30:

```
Review Settings
Press OK or DONE
```

Pressing the "DONE" button 38 results in a return to the General Options menu.

Pressing the "OK" button 34 produces the following display 30:

```
Scroll for
Stepwise Review
```

Scrolling initiates the presentation of a series of displays showing the current system status, the fine tuning factors for each zone, the start time, and the current irrigation schedule. Presentation of the screens can be controlled by rotating the dial 32.

The review begins with an identification of the current version of the SIC software and its release date, for example:

```
Version 1.01
12/5/04
```

System status is then presented using a display 30 of the type illustrated here.

```
System Status
System is ON
```

Fine tuning factors for each zone are presented using a display 30 of the type illustrated here.

```
Group A Zone 1
Adjustment 100%
```

The start time is presented using a display 30 of the type illustrated here:

```
Start Time
12:00 AM
```

If the current irrigation schedule is a daily schedule, it is presented using a display 30 of the type illustrated here:

```
Daily Schedule
SuMo WeTh Sa
```

If the current irrigation schedule is an interval schedule, it is presented using a display 30 of the type illustrated here.

```
Interval Sched.
Interval: 3 Days
```

If the current irrigation schedule is an odd/even schedule, it is presented using a display 30 of the type illustrated here.

```
ODD/EVEN Sched.
ODD Days Water
```

For the benefit of installers and maintenance technicians, a combination of button depression and scrolling (e.g. holding any button down while scrolling one step) may be used to toggle into and out of a set of additional scrollable review screens (not illustrated here but see the notes to state 24 in FIG. 4c) that show the current values for each step of the MC/WN tables described in Section E.4) below, as well as the dates of the last five calibrations and the values obtained therein for field capacity and Table Delta. These screens may also show the dates of the last few irrigation cycles and the associated runtimes.

h) Recalibration

The SIC 10 performs a special set of routines at the first start time following power-up, or in response to selected suspect operating conditions, to assure its proper calibration and setting before normal operation is commenced, or is resumed after a power failure or perceived malfunction. The purpose of the calibration is to define the sensor voltage corresponding to the field capacity moisture level as described in Section E.3) below.

Because a user may desire to recalibrate the sensors manually, an OK response to the General Options selection "Recalibrate" (called "Calibrate" if the SIC 10 has never previously been calibrated) momentarily produces a screen

```
Entering
Calibration
``` followed by a screen

```
Group A: Scroll
1 2 3 4 5 6 7 8
```

Turning the knob 32 scrolls through the zone control options

OK=Accept as is
OK=Zone 1 OFF
OK=Zone 2 OFF
OK=Zone 3 OFF
OK=Zone 4 OFF
OK=Zone 5 OFF
OK=Zone 6 OFF
OK=Zone 7 OFF
OK=Zone 8 OFF
OK=All ON
OK=All OFF Making the appropriate selection(s) and pressing OK produces the screen

```
Master Zone Group A
1 Scroll & OK
```

Selecting the appropriate master zone and pressing OK produces the corresponding screen for Group B. If there is no sensor for Group B, the screen reads

```
No sensor Group B
Press OK
```

Upon pressing OK, the display momentarily shows

```
To Calibrate
Pick Start Time
```

An OK response then displays, e.g.

```
Start 5:00 PM
Scroll; Press OK
```

Pressing OK at this point initiates the automatic calibration routine of Section E.3). Until the calibration routine actually starts, the following sequence of screens alternates at, e.g., two-second intervals:

```
Jan 6 2004
12:30 PM
```

```
Calib Begins at
Jan 6 5:00 PM
```

```
Press OFF button
To Cancel
```

When calibration is under way, the above sequence changes to:

```
Calibrating
5:20 PM
```

```
Zone 1 running
Time left 45 sec
```

```
Next Sensor Read
in 38 min
```

```
Moisture Level 1
2.45 Volts
```

```
Press OFF button
to Cancel
```

The second and fourth screens show the status of the currently running zone. In addition, "Calibration—Reading Sensor" momentarily replaces the third screen when a sensor is being read. Pressing OFF at any time after calibration is initiated cancels the calibration process and returns the program to the General Options screen.

i) Moisture Levels

The moisture level of the soil can be checked at any time by selecting the Moisture Levels option of the General Options menu. This produces the screen

```
Press OK to read
Moisture Levels
```

On OK, a screen

```
Reading Sensor 1
Moisture Level
``` momentarily appears while Sensor 1 is being read, followed by the result screen

```
Moisture Level 1
2.45 Volts
```

After a few seconds, the reading sequence repeats for Sensor 2. Pressing DONE returns the program to the General Options menu.

i) Sensor Error Help

Suggestions for handling apparent sensor errors may be provided by scrolling the display 30 through a set of running screens that provide instructions for coping with the most common types of sensor errors or malfunctions that are likely to be experienced.

E. Self-Adjusting Operation

1) Start-Up Wizard

Normally, the SIC 10 would not be calibrated until all the General Options have first been set. This allows an initial manual or new lawn operation without the time-consuming calibration routine. It is, however, sometimes desirable to go into calibration directly upon power-up. In order to set up the minimal choices necessary for the operation of the calibration routine, it is optionally desirable to provide a wizard program which readies the SIC 10 for calibration. This wizard program activates when the SIC 10 powers up for the first time, or following a power loss. Once the Start-up Wizard steps have been completed and the calibration process finishes, the user will be allowed to access all the controller functions. However, if power is lost prior to a successful calibration as described in the Automatic Sensor Calibration section below, the user will be required to repeat the mandatory steps of the wizard at power up. As pointed out above, the Manual and New Lawn schedules can be accessed by the user prior to using or completing the Start-up Wizard and Calibration requirements. The following mandatory steps of the wizard ensure that all details are in place for the SIC 10 to run properly.

a) Enter the correct Time and Date—The display 30 prompts by flashing a variable. After selecting a value, pushing the "OK" button 34 causes each subsequent variable to flash until the selection process is complete (see state 7 of FIG. 4*a*).

b) Enter the Active Days and Start Time—States 14 through 18 occur as shown in FIG. 4*b* without returning to state 13. The choices of "days to water" and "start time" are thereby defined. A default start time of 6:00 am appears initially.

c) Assign Zones to a Group—Group areas of similar plant material such as turf or shrubs together to receive similar watering cycles. Any zone not selected for group A is automatically placed in group B (see state 11 of FIG. 4*b*).

d) Assign a master zone to each sensor—Select the zone designated as the master zone as shown in states 9 and 10 of FIG. 4*b*. Only the zones associated with group A will appear. The display 30 shows

| Master Zone GrpA |
| 1 Scroll; & OK |

The user selects the zone most influential to Sensor 18, then repeats the selection with respect to group B (sensor 20). This completes the wizard function. The display 30 then shows

| Auto Calib at |
| 8/27 7:50 AM | wherein the date and time shown is the start date and time of the first scheduled watering cycle as determined by the responses to states 14 and 18. The program then goes into the automatic calibration routine described below. During the calibration process, the display 30 recurrently displays the appropriate set of screens shown in Section D.3)h) above.

2) Automatic sensor calibration

At the start time for the first scheduled watering cycle, as indicated by the start-up wizard for an SIC 10 that has never been calibrated, or upon a subsequent recalibration, the SIC 10 goes through a calibration process to determine the target wetness value of each zone group. The SIC 10 proceeds as follows:

a) A sensor reading $S_1$ (in volts) is taken at the start of the watering cycle. The readings referred to herein are preferably rolling 10-minute averages of one measurement per minute.

b) Irrigation runs for a predetermined time, e.g. three minutes, per zone. This value could be adjusted for sprinkler precipitation rate and soil infiltration rate. Multiple short watering intervals with short dwell intervals between them could be used instead of a single watering interval.

c) A predetermined time (e.g. two hours) later a second sensor reading $S_2$ is taken. $S_2$ is compared with $S_1$.

d) If $S_2$ is lower than $S_1$ (a wetter condition), additional sets of three-minute cycles occur at two-hour intervals until consecutive sensor readings are essentially the same, i.e. less than 5% of one Table Delta from each other.

e) The stable readings are deemed to measure "field capacity", i.e. the maximum amount of water capable of being held in that particular soil. Target voltage or target wetness value $S_t$ for Sensor 18 can then be established. $S_t$ is a function of the sensor voltage $S_{fc}$ at field capacity (e.g. 1 V) and an empirically determined offset voltage. In the preferred embodiment this offset has been established to be user-selectable in the range of one to three Table Deltas. A Table Delta is the voltage span represented by one lookup table value. For the sensors of the preferred embodiment an appropriate Table Delta of $S_{fc}/8$ was empirically established. This results in the formula below:

$$S_t = N*S_\Delta + S_{fc}, \text{ where} \tag{1}$$

$S_\Delta = S_{fc}/8$ (one Table Delta)
N=number of $S_\Delta$ (user selectable to be from one to three, in increments of ½). If N=1 and $S_{fc}$=1, then . . . $S_t$=1.125 in which the target value of 1.125 is an empirical value representing the ideal soil moisture content for optimal growing conditions of a particular type of vegetation in a particular type of soil for a particular type of sensor. The field capacity value $S_{fc}$ and the top-of-the-table value, from which $S_t$ can be calculated, are stored for each of the sensors 18, 20 in non-volatile memory. A Table Delta value indicating both the voltage differential between field capacity and the default target wetness, and the voltage differential between each of the runtime table entries, is also calculated. Calibration is initiated automatically when $S_1$ falls below the established field capacity.

Periodic recalibration may be performed automatically. A typical period between calibrations could be a time interval such as a month or quarter, or a pre-set number of watering cycles. Alternatively, recalibration may be triggered by other factors such as sensor measurement comparisons indicating a significant change in soil conditions, or in accordance with Rule 6 of Section D.4)a) below.

3) Normal Watering Cycle

Once the SIC 10 has been calibrated as described above, normal watering cycles will be executed as scheduled. The master zone runtime of each group for these watering cycles is computed in each watering cycle as follows:

At the start time of the watering cycle, a first voltage reading $S_0$ (calculated from a ten-minute rolling average sampled once per minute) is taken of sensor 18.

In the MC/WN table, $S_0$ correlates to a runtime $T_r$ (in minutes), which the SIC 10 applies, with appropriate modifications due to fine tuning factors, to all zones in group A. If $T_r$ is less than the preselected no water limit (e.g. three minutes), no watering occurs. The threshold at which watering occurs may be variable with a range from, e.g., 2 to 6 minutes (see section D.3)d)vi) above). If $T_r$ is greater than two minutes in the preferred embodiment, each zone runs for three-minute cycles (no longer than this to minimize the chance of run-off), then remains off for 21 minutes or until the group A zones complete their first watering cycle, whichever time is greater. Instead of being fixed, the runtime for each zone cycle could be a user-selectable variable, for example from 3 to 8 minutes, in an alternative embodiment. When group A has completed its first watering cycle, the actions of this and the preceding paragraph are repeated for group B (sensor 20). Runoff could also be controlled by another possible menu option which would select sprayheads or rotors having substantially different precipitation rates if the system is so equipped. This would better optimize different variables such as maximum permitted zone interim runtime to minimize runoff.

Groups A and B then repeat their watering cycles until the total runtime of all zones has been achieved. (It will be understood that each sensor 18, 20 must be placed within the influence of only one group, A or B, to assure that proper control is achieved).

4) Runtime Table Adjustments a) Rules

Values of runtime in the MC/WN or runtime table stored in the nonvolatile memory 50 of FIG. 3 are reviewed after each irrigation cycle and automatically adjusted by a prescribed algorithm in accordance with the following rules (as noted above, all sensor readings are based on rolling 10 minute averages):

1. At the start time of irrigation, a sensor reading is taken. This reading is compared to the current top voltage value of the MC/WN table. If the sampled value is greater than the top of the table, the table is expanded to include the sampled value as the new top of the table. Next, the voltage range from the existing field capacity value to the new top of the table value is divided by N+15 (where N is a selected integer) to produce a new Table Delta value. The new Table Delta value times N is added to the field capacity value to derive a new default $S_t$ value which is the new table base. The table then ranges from the new $S_t$ to the new top of the table in fifteen Table Delta steps.

Some sub-rules that pertain to the target wetness $S_t$ and the Table Delta $S_\Delta$ are summarized below:

a. $S_t = N \ast S_\Delta + S_{fc}$, where . . . (from formula (1), above)
      $S_\Delta = S_{fc}/8$ (one Table Delta)
      N=selected number of $S_\Delta$
   b. If $S > S_{fc} + (N+15) \ast S_\Delta$, then $S_\Delta = (S - S_{fc})/(N+15)$
   c. If $S_{fc} + (N+15) \ast S_\Delta > S_{excessively\ dry}$, then $S_\Delta = (S_{excessively\ dry} - S_{fc})/(N+15)$
   d. Note that $S_t$ is dependent on N and $S_\Delta$.
   e. In order to not lose the effect of the essence of b or c above upon recalibration, save the denominator defined by . . .
      $D = S_{fc}/S_\Delta$, and use . . .
      $S_\Delta = S_{fc}/D$ from this point forward.

If $S_{fc}$ changes by little during a calibration, $S_\Delta$ will change a little, but will be more appropriate than if D were to revert back to the default value of 8. The next watering cycle will subjugate D to paragraphs b and c during the next watering cycle in case it needs to be refined further.

In the event that the table index never becomes higher than, say, 5 over a sufficiently long time, D may be reverted back to the default value (8 in this example), or may be set to an even higher number (resulting in a lower $S_\Delta$). Thus the range of sensor values that are covered by the table may be shrunk as well as expanded.

2. The sensor reading of Rule 1 is now compared to the target wetness value adjusted according to the Wetness Adjust factor. If the sensor reading is not drier than the target wetness value, no action occurs and the irrigation system does not run.

3. If the sensor reading is drier than the target wetness value, the reading is used as an index into the MC/WN table, and the runtime associated with that reading in the table is obtained.

4. If the obtained runtime is less than the user-selected minimum allowable runtime, no action occurs and the irrigation system does not run.

5. If the obtained runtime is greater than or equal to the minimum allowable runtime, irrigation occurs for the obtained runtime.

6. At a predetermined time after irrigation has taken place, a second sensor reading is taken and compared to the current field capacity value. If it is lower than the current field capacity value, the runtime value associated with the first reading in the MC/WN table is decreased by 1 minute and an immediate recalibration cycle is initiated (unless it is no longer a water day, in which case the recalibration is scheduled for the next water day).

7. The second reading is then compared to the target wetness value. If the second reading is significantly drier than the target wetness value, the runtime value associated with the first reading in the MC/WN table is increased. The amount of the increase depends upon the modification algorithm being used.

8. If the second reading is significantly wetter than the target wetness value, the runtime value associated with the first reading in the MC/WN table is decreased. The amount of the decrease depends upon the modification algorithm being used.

9. If the second reading is not significantly different from the target wetness value, the MC/WN table is not modified.

10. Water shortfall correction: If, after Rules 7 and 8, the current sensor reading predicts a runtime satisfying rule 5, a correction per the modification algorithm is added to the table value that initiated the watering cycle, and another one-time watering is initiated for the duration of the aforementioned runtime satisfying rule 5. The sum of the two runtimes replaces the initial runtime in the table. The second watering is done using the table runtime based on the second reading, not the sum.

11. If a runtime in the MC/WN table is increased pursuant to Rule 7, all MC/WN table entries corresponding to reading values drier than the first reading are also examined. If any of these drier values are associated in the table with runtimes that are less than the increased runtime produced by Rule 7, the runtimes associated with them are changed to equal the new runtime now associated with the first reading.

12. If a runtime in the MC/WN table is decreased pursuant to Rule 8, all MC/WN table entries corresponding to reading values wetter than the first reading are also examined. If any of these wetter values are associated in the table with runtimes that are greater than the decreased runtime produced by Rule 8, the runtimes associated with them are changed to equal the new runtime now associated with the first reading.

13. Following a runtime increase pursuant to Rule 7, if there is a table entry immediately adjacent the entry for the first reading and corresponding to reading values wetter than the first reading, the runtime associated with that adjacent entry is examined. If that runtime is less than the minimum allowable runtime, it is increased by an amount dictated by the algorithm (e.g. one minute).

14. If there are additional table entries in the direction of greater wetness, the process of Rule 13 is repeated from one table entry to the next until no more wetter table entries are left.

Rules 13 and 14 assure that table entries with runtimes shorter than the minimum allowable runtime are moved in the direction of irrigation and table modification (when underwatered conditions warrant it), while some separation may be maintained as appropriate between the adjacent table entry runtimes that remain below the minimum allowable runtime.

b) Modification Algorithms

Although a number of alternative algorithms can be employed, there are three algorithms that vie for preferred status:

i) Fixed Increment:

A predetermined time after all zones in a group have completed their runtime (i.e. a time sufficient for the irrigation water to have percolated the soil and equilibrated), a second voltage measurement $S_1$ is taken from the appropriate sensor 18 or 20. $S_1$ is compared to the target voltage $S_t$. If the two values differ by a selected significant amount (e.g. by more than 0.05 to 0.2 V), the runtime corresponding to $S_0$ in the MC/WN table is incremented or decremented, depending upon the direction of the difference, by a fixed amount, preferably one minute. Where this would produce an inconsistency with adjacent runtimes in the table, the latter are also adjusted to match.

ii) Proportional:

A more exact and more quickly adjusting but more complex proportional approach than the fixed-increment approach is as follows:

Again, at a predetermined time after all zones of group A have completed their runtime (i.e. a time sufficient for the irrigation water to have percolated the soil and equilibrated), a second voltage measurement $S_1$ is taken from sensor 18. The second voltage measurement $S_1$, the target wetness value $S_t$, and the runtime $T_r$ corresponding to the voltage $S_1$ are combined in an algorithm to provide a new runtime value $T_n$ for the $S_1$ voltage in the MC/WN table. The formula for this algorithm is:

$$T_n = ((S_0 - S_t)/(S_0 - S_1)) \times T_r \qquad (2)$$

in which $S_0$=Sensor 18 reading before irrigation, volts $S_1$=Sensor 18 reading a predetermined time after irrigation, volts $S_t$=Target wetness value, volts $T_r$=Runtime value associated with sensor reading $S_0$, minutes $T_n$=New runtime value replacing $T_r$, minutes $T_n$ replaces $T_r$ in the MC/WN table for the master zone of group A. It then becomes $T_r$ for the purposes of the system's next irrigation cycle and until subsequently changed by future readjustments. The start of an irrigation cycle of group B results in the same action with respect to the MC/WN table for group B.

iii) Convergent

This approach is almost as simple as i), about as fast as ii), but somewhat more stable than ii) and works as follows:

The sensor reading taken after irrigation and percolation is used to look up the runtime in the table that corresponds to what needs yet to be added (this of course assumes that the original runtime was too short) to bring the soil moisture back to the target value. This value is added to the value in the register from which the original runtime was determined. Since the table is being adjusted, it isn't perfect yet, but the runtimes in it represent the best current guess, so this method should cause the table to converge to an accurate configuration in the shortest possible time. Further, if the correction to the runtime is larger than the minimum allowed runtime, it can be immediately applied, assuring that the turf will not die before the next watering window, as could be the case if the table default values are too low.

All three of the above-described algorithms may contain safeguards for controlling the new runtime $T_n$. First, $T_n$ must never increase more than twice the value of $T_r$. This prevents runaway watering conditions in case of a system malfunction that fails to deliver water at all, or in case of a sensor failure. Secondly, the maximum value of $T_n$ should be no more than 30 minutes for the operation of sprayheads or rotors, or other appropriate times for drip systems. Additionally, $T_n$ must never be a negative number. If the calculated value of $T_n$ is negative, the SIC 10 may cease adjustments and generate a visual and/or audible alarm.

c) Example 1

With the understanding that the MC/WN tables set out below are merely examples of a currently preferred embodiment and are subject to change in accordance with the needs of specific hardware and a specific installation, the MC/WN table of a typical SIC 10 could be organized to cover sensor voltages ranging from the target value (a value slightly higher than $S_{fc}$, e.g. 0.125 V higher) to a value 2 V above $S_{fc}$ (this is empirically the largest swing between excessive wetness and excessive dryness expected for most soil types for a representative embodiment of a sensor). In the preferred embodiment, the MC/WN tables partition this voltage range into fifteen equal 0.125 V segments (2 V/16=0.125 V). It will be understood that the number of segments could be different, but in the preferred embodiment, fifteen were found to give sufficient resolution. Suppose now that the target sensor value $S_t$, is 1+0.125=1.125 V in accordance with equation (1) above. Then the initial runtimes assigned to each segment might be empirically chosen as follows:

TABLE I

| Entry # | Sensor reading range (volts) | Runtime (minutes) |
|---|---|---|
| 14 | 2.875-2.999 | 15 |
| 13 | 2.750-2.874 | 14 |
| 12 | 2.625-2.749 | 13 |
| 11 | 2.500-2.624 | 12 |
| 10 | 2.375-2.499 | 11 |
| 9 | 2.250-2.374 | 10 |
| 8 | 2.125-2.249 | 9 |
| 7 | 2.000-2.124 | 8 |
| 6 | 1.875-1.999 | 7 |
| 5 | 1.750-1.874 | 6 |
| 4 | 1.625-1.749 | 5 |
| 3 | 1.500-1.624 | 4 |
| 2 | 1.375-1.499 | 3 |
| 1 | 1.250-1.374 | 2 |
| 0 | 1.125-1.249 | 1 |

If the pre-irrigation sensor reading is less than 1.125 volts, obviously no irrigation will occur. With the runtimes of Table I, no irrigation will occur if the reading is less than 1.375, because of the earlier-mentioned stipulation that runtimes of less than the user-selected minimum (e.g. 3) minutes will be ignored.

Let us now assume that at the start of an irrigation cycle, the sensor reading $S_0$ is 2.24 V. In accordance with Table I, a 9-minute irrigation cycle will occur. When the irrigation effect has settled, an $S_1$ reading is taken and found to be 1.55 V. In as much as this is a significant difference from the 1.125 V of $S_t$, a modification of Table I is indicated. In accordance with Rule 7, the 9-minute runtime of entry #8 is increased to 10 minutes to form a new table as follows:

TABLE II

| Entry # | Sensor reading range (volts) | Runtime (minutes) |
|---|---|---|
| 14 | 2.875-2.999 | 15 |
| 13 | 2.750-2.874 | 14 |

TABLE II-continued

| Entry # | Sensor reading range (volts) | Runtime (minutes) |
|---|---|---|
| 12 | 2.625-2.749 | 13 |
| 11 | 2.500-2.624 | 12 |
| 10 | 2.375-2.499 | 11 |
| 9 | 2.250-2.374 | 10 |
| 8 | 2.125-2.249 | 10 |
| 7 | 2.000-2.124 | 8 |
| 6 | 1.875-1.999 | 7 |
| 5 | 1.750-1.874 | 6 |
| 4 | 1.625-1.749 | 5 |
| 3 | 1.500-1.624 | 4 |
| 2 | 1.375-1.499 | 3 |
| 1 | 1.250-1.374 | 2 |
| 0 | 1.125-1.249 | 1 |

At the start of the next watering cycle, the soil can arbitrarily be assumed to be a little wetter due to weather conditions, and the $S_0$ reading may be 2.22 V. This is still in the 2.125-2.249 V range, but this time, the reading in that range will produce a 10-minute runtime. Now assume that the post-irrigation reading $S_1$ is 1.4 V—better but still significantly larger than $S_t$. Again, the runtime for entry #8 is incremented by one minute. This time, however, the runtime for entry #9 is also incremented by one minute because it must not produce less watering than the wetter range of entry #8. The result is the following table:

TABLE III

| Entry # | Sensor reading range (volts) | Runtime (minutes) |
|---|---|---|
| 14 | 2.875-2.999 | 15 |
| 13 | 2.750-2.874 | 14 |
| 12 | 2.625-2.749 | 13 |
| 11 | 2.500-2.624 | 12 |
| 10 | 2.375-2.499 | 11 |
| 9 | 2.250-2.374 | 11 |
| 8 | 2.125-2.249 | 11 |
| 7 | 2.000-2.124 | 8 |
| 6 | 1.875-1.999 | 7 |
| 5 | 1.750-1.874 | 6 |
| 4 | 1.625-1.749 | 5 |
| 3 | 1.500-1.624 | 4 |
| 2 | 1.375-1.499 | 3 |
| 1 | 1.250-1.374 | 2 |
| 0 | 1.125-1.249 | 1 |

At the start of the next watering cycle, the soil can again arbitrarily be assumed to be a little wetter due to weather conditions, and the So reading may be 2.13 V. This is still in the range of entry #8, but this time, the reading in that range will produce an 11-minute runtime. This results in over-watering for a combination of reasons such as that the voltage was at the bottom of the discrete voltage range rather than the top, or that there is an inherent limit to the precision of the sensors. Assuming that $S_1$ after this runtime comes in at 1.1 V, thus overshooting the 0.125 V target value, and assuming that the table modification threshold is 0.01 V, the range of entry #8 is now decremented back to 10 minutes by Rule 8, resulting in the following table:

TABLE IV

| Entry # | Sensor reading range (volts) | Runtime (minutes) |
|---|---|---|
| 14 | 2.875-2.999 | 15 |
| 13 | 2.750-2.874 | 14 |
| 12 | 2.625-2.749 | 13 |
| 11 | 2.500-2.624 | 12 |

TABLE IV-continued

| Entry # | Sensor reading range (volts) | Runtime (minutes) |
|---|---|---|
| 10 | 2.375-2.499 | 11 |
| 9 | 2.250-2.374 | 11 |
| 8 | 2.125-2.249 | 10 |
| 7 | 2.000-2.124 | 8 |
| 6 | 1.875-1.999 | 7 |
| 5 | 1.750-1.874 | 6 |
| 4 | 1.625-1.749 | 5 |
| 3 | 1.500-1.624 | 4 |
| 2 | 1.375-1.499 | 3 |
| 1 | 1.250-1.374 | 2 |
| 0 | 1.125-1.249 | 1 |

Thus, over a period of time, the MC/WN table adjusts itself to changing conditions, and converges toward a post-irrigation achievement of the ideal target value $S_t$, although there may be times when a particular runtime value oscillates up and down by one minute with no deleterious effect (the assumption being that the runtime is off from ideal by less than one minute, which is insignificant).

Rules 1-12 above provide no facility for modification of the MC/WN table for entries with runtimes less than the minimum allowable runtime. Modification of the table can occur only after irrigation, and readings corresponding to these entries do not produce irrigation. It is therefore necessary to provide a mechanism which, under the appropriate circumstances, will allow all table entries to produce irrigation and therefore become subject to modification. Rules 13 and 14 provide that mechanism.

As a matter of example, assume that the pre-irrigation sensor reading So is 1.4 V. This reading corresponds to entry #2 in the foregoing tables. As shown in Table I, this causes the irrigation system to run for three minutes, which is assumed to have been selected as the minimum allowable runtime. Now assume that the post-irrigation sensor reading $S_1$ is still 1.4 V. This value is significantly drier than the 1.125 V target value. Consequently, in accordance with Rule 7, the runtime associated with entry #2 is now raised to four minutes. The runtimes associated with entries #1 and #0, however, can never change because these entries will produce no irrigation.

The foregoing problem is addressed by Rules 12 and 13. In accordance with Rule 12, the raising of the runtime for entry #2 causes the runtime for entry #1 to be raised by one minute. Likewise, in accordance with Rule 13, the raising of entry #1 causes the runtime for entry #0 to also be increased by one minute. The result of this action produces the following table:

TABLE V

| Entry # | Sensor reading range (volts) | Runtime (minutes) |
|---|---|---|
| 14 | 2.875-2.999 | 15 |
| 13 | 2.750-2.874 | 14 |
| 12 | 2.625-2.749 | 13 |
| 11 | 2.500-2.624 | 12 |
| 10 | 2.375-2.499 | 11 |
| 9 | 2.250-2.374 | 10 |
| 8 | 2.125-2.249 | 9 |
| 7 | 2.000-2.124 | 8 |
| 6 | 1.875-1.999 | 7 |
| 5 | 1.750-1.874 | 6 |
| 4 | 1.625-1.749 | 5 |
| 3 | 1.500-1.624 | 4 |
| 2 | 1.375-1.499 | 4 |
| 1 | 1.250-1.374 | 3 |
| 0 | 1.125-1.249 | 2 |

Now, an $S_1$ reading in the range of entry #1 will cause the irrigation system to run for the three-minute minimum allowable runtime. If the post-irrigation sensor reading then warrants it, the runtime for entry #1 will be raised to four minutes, and the runtime for entry #0 will be raised to an allowable three minutes under a renewed application of Rule 12.

d) Example 2

Now consider a typical normal watering cycle using the above-described proportional algorithm. Assume that a pre-irrigation sensor reading is taken and found to be 2.15 volts. Using the above table, the master zone of the affected group would again be scheduled to run for 9 minutes. Since this is more than 2 minutes, the irrigation cycle would occur. Following completion of the irrigation cycle (after a sufficient delay to allow the water to infiltrate and equilibrate), the post-irrigation sensor reading is taken. As a matter of example, this reading will again be assumed to be 1.55 volts. This post-irrigation sensor reading is now compared to $S_t$ to determine if the 9-minute irrigation was effective in bringing the soil to the desired level of moisture content. In this case, the post-irrigation sensor reading is found to be greater than $S_t$ by more than the modification threshold value. This indicates that there needs to be a change to the MC/WN table entry used to determine the 9-minute runtime, because nine minutes was not sufficient to bring the soil moisture content to the desired level. The new runtime for the adjusted Table V can be determined by plugging all the appropriate values into formula (2) above.

Pre-irrigation Reading=2.15 volts

Post-irrigation Reading=1.55 volts

Target Wetness Value=1.125 volts

Original Runtime Value=9 minutes

New Runtime Value=((2.15−1.125)/(2.15−1.55))×9=15 minutes

So the runtime table entry associated with a voltage range of 2.125-2.249 V in the updated Table II will be changed from 9 minutes to 15 minutes. But notice that there are table entries associated with higher (indicating drier) voltages that correspond to runtimes less than 15 minutes. By convention, we require that the runtimes associated with these voltages must also be at least 15 minutes. After making the changes, the new table appears as follows:

TABLE VI

| Entry # | Sensor reading range (volts) | Runtime (minutes) |
|---|---|---|
| 14 | 2.875-2.999 | 15 |
| 13 | 2.750-2.874 | 15 |
| 12 | 2.625-2.749 | 15 |
| 11 | 2.500-2.624 | 15 |
| 10 | 2.375-2.499 | 15 |
| 9 | 2.250-2.374 | 15 |
| 8 | 2.125-2.249 | 15 |
| 7 | 2.000-2.124 | 8 |
| 6 | 1.875-1.999 | 7 |
| 5 | 1.750-1.874 | 6 |
| 4 | 1.625-1.749 | 5 |
| 3 | 1.500-1.624 | 4 |
| 2 | 1.375-1.499 | 4 |
| 1 | 1.250-1.374 | 3 |
| 0 | 1.125-1.249 | 2 |

The foregoing examples show that the proportional algorithm follows changing conditions faster, but is more susceptible to excessive runtime fluctuations as conditions change, e) Example 3

This example illustrates the use of the convergent modification algorithm described in Section E.4)b)iii) above. In this example, the following pre-irrigation Table VII is the same as Table I of Example 1:

TABLE VII

| Entry # | Sensor reading range (volts) | Runtime (minutes) |
|---|---|---|
| 14 | 2.875-2.999 | 15 |
| 13 | 2.750-2.874 | 14 |
| 12 | 2.625-2.749 | 13 |
| 11 | 2.500-2.624 | 12 |
| 10 | 2.375-2.499 | 11 |
| 9 | 2.250-2.374 | 10 |
| 8 | 2.125-2.249 | 9 |
| 7 | 2.000-2.124 | 8 |
| 6 | 1.875-1.999 | 7 |
| 5 | 1.750-1.874 | 6 |
| 4 | 1.625-1.749 | 5 |
| 3 | 1.500-1.624 | 4 |
| 2 | 1.375-1.499 | 3 |
| 1 | 1.250-1.374 | 2 |
| 0 | 1.125-1.249 | 1 |

Assuming a pre-irrigation sensor reading of 2.6 V, the SIC 10 will irrigate for 12 minutes (typically in a series of three-minute increments). A post-irrigation sensor reading is then taken as previously described herein and found to be 1.6 V. This sensor reading corresponds to a four-minute runtime in Table VII. In accordance with the convergent modification algorithm, that four-minute runtime is added to the 12-minute runtime in Table VII, and the adjacent runtimes are modified as described in Example I, to produce a modified Table VIII:

TABLE VIII

| Entry # | Sensor reading range (volts) | Runtime (minutes) |
|---|---|---|
| 14 | 2.875-2.999 | 16 |
| 13 | 2.750-2.874 | 16 |
| 12 | 2.625-2.749 | 16 |
| 11 | 2.500-2.624 | 16 |
| 10 | 2.375-2.499 | 11 |
| 9 | 2.250-2.374 | 10 |
| 8 | 2.125-2.249 | 9 |
| 7 | 2.000-2.124 | 8 |
| 6 | 1.875-1.999 | 7 |
| 5 | 1.750-1.874 | 6 |
| 4 | 1.625-1.749 | 5 |
| 3 | 1.500-1.624 | 4 |
| 2 | 1.375-1.499 | 3 |
| 1 | 1.250-1.374 | 2 |
| 0 | 1.125-1.249 | 1 |

The SIC 10 will then use Table VIII for the next irrigation cycle. In the meanwhile, however, the SIC 10 notes that the four-minute runtime associated with the post-irrigation reading is greater than the (assumed) three-minute no-water limit set in Section D.3)d)vi) above. Consequently, the SIC 10 initiates an immediate four-minute irrigation to prevent the soil from becoming excessively dry before the next watering.

It should be noted that the convergent algorithm can only be applied in the event that the table entries cause insufficient watering. A fixed increment algorithm needs to be used to correct over-watering.

5) Special Conditions

After a predetermined number of start times under steady conditions (five start times may be a value of choice), if a sufficient approximation of sensor value $S_t$ by $S_1$ has not been achieved, a visual alarm may be displayed alerting the user to a condition that may indicate a system problem. A check should be made in that event to determine whether manual watering is needed, and equipment examination for malfunctions may be appropriate as the area under the control of the relevant sensor is likely being under-watered.

As discussed above in Sections B.6)e) and D.3)e)iii) above, new turf plantings may require special cycles to assure a higher level of wetness until the turf becomes well established. The moisture sensor control of this invention is inoperative while the new lawn schedule is in effect. A problem noted with conventional systems that provide new lawn schedules is the user's failure to return the system to normal watering once the lawn is established. Consequently, the microcontroller 42 limits the duration of new lawn schedules and automatically converts to the normal watering schedule described in Section B.6)e) above after a selectable number of days or weeks suitable for grow-in. At that point, the automatic sensor calibration occurs, and normal soil moisture management resumes.

What is claimed is:

1. A method of determining the field capacity of an irrigated soil, comprising the steps of:
    providing an irrigation controller coupled to a sprinkler system arranged to distribute water over said soil;
    executing a calibration cycle on said irrigation controller;
    said calibration cycle directing said irrigation controller to repeatedly irrigate said soil for short periods of time at predetermined intervals;
    said calibration cycle directing said irrigation controller to measure the moisture level of said soil at each of said intervals;
    said calibration cycle comparing successive measurements to each other; and
    if said successive measurements indicate an increasing moisture level, said calibration cycle determining said field capacity as being the moisture level at which successive measurements differ from each other by less than a predetermined threshold;
    creating an irrigation schedule with the newly calibrated irrigation controller based, in part, on said determined field capacity.

2. The method of claim 1, in which said periods of time are about three minutes, said predetermined intervals are about one hour, and said predetermined threshold is about 1% of full scale.

3. A method of establishing a field capacity value of a region of soil comprising:
    providing an irrigation controller coupled to a sprinkler system for distributing water over said region of soil;
    executing a calibrating cycle routine on said irrigation controller;
    said calibration cycle routine directing said irrigation controller to water said region intermittently at predetermined periods of time;
    said calibration cycle routine directing said irrigation controller to obtain a moisture value at each of said period of time;
    said calibration cycle routine comparing said moisture values;
    said calibration cycle routine establishing a field capacity value when said comparing of said moisture values results in successive moisture values differing by less than a threshold amount;
    calibrating a moisture sensor with said irrigation controller based on said field capacity value.

4. A method of evaluating field capacity of a volume of soil comprising:
    providing an irrigation controller coupled to a sprinkler system arranged to distribute water over said volume of soil;
    executing a calibration cycle on said irrigation controller;
    supplying water to said volume of soil at short intervals at predetermined periods of time with said irrigation controller;
    obtaining a moisture value for each of said period of time;
    comparing successively obtained moisture values with said irrigation controller;
    establishing a field capacity value when said comparing of said successively obtained moisture values results in said moisture values differing by less than a predetermined amount;
    irrigating said volume of soil with said newly calibrated irrigation controller based in part on said determined field capacity value.

* * * * *